(12) United States Patent
Yukumi et al.

(10) Patent No.: US 9,568,059 B2
(45) Date of Patent: Feb. 14, 2017

(54) DISC BRAKE

(71) Applicant: HITACHI AUTOMOTIVE SYSTEMS, LTD., Ibaraki (JP)

(72) Inventors: Hironobu Yukumi, Kawasaki (JP); Shigeru Hayashi, Minami Alps (JP); Nobuhiro Wakabayashi, Minami Alps (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 14/428,500

(22) PCT Filed: Sep. 24, 2013

(86) PCT No.: PCT/JP2013/075694
§ 371 (c)(1),
(2) Date: Mar. 16, 2015

(87) PCT Pub. No.: WO2014/050811
PCT Pub. Date: Apr. 3, 2014

(65) Prior Publication Data
US 2015/0247542 A1 Sep. 3, 2015

(30) Foreign Application Priority Data

Sep. 25, 2012 (JP) .............................. 2012-210707

(51) Int. Cl.
*F16D 65/54* (2006.01)
*F16D 66/02* (2006.01)
(Continued)

(52) U.S. Cl.
CPC ........... *F16D 65/543* (2013.01); *F16D 55/225* (2013.01); *F16D 55/2265* (2013.01);
(Continued)

(58) Field of Classification Search
CPC .................. F16D 65/097; F16D 65/0997; F16D 65/0979; F16D 65/0978
(Continued)

(56) References Cited

U.S. PATENT DOCUMENTS 5,934,417 A * 8/1999 Kobayashi ............ F16D 55/227
188/1.11 W
5,947,233 A * 9/1999 Kobayashi ............ F16D 55/227
188/1.11 W
(Continued)

FOREIGN PATENT DOCUMENTS

EP 1 010 913 6/2000
JP 52-13383 1/1977
(Continued)

OTHER PUBLICATIONS

Office Action issued Aug. 25, 2015 in corresponding Japanese patent application No. 2014-538491 (with English translation).
(Continued)

*Primary Examiner* — Thomas Irvin
(74) *Attorney, Agent, or Firm* — Wenderoth, Lind & Ponack, L.L.P.

(57) ABSTRACT

A return spring (21) made of a metal plate, for biasing a friction pad (6) in a return direction of separating away from a disc (1) is arranged between the friction pad (6) and a mounting member (2). The return spring (21) includes a fixed portion (22), which is on a base end side fixed to an ear portion (7B) of a back plate (7) of the friction pad (6). Then, an abutment portion (25), which is on a distal end side of the return spring (21), is elastically brought into abutment on an abutment plate portion (13D) of a pad spring (13), which is on the mounting member (2) side at a position on an outer side in a disc radial direction relative to the fixed portion (22).

11 Claims, 13 Drawing Sheets

(51) Int. Cl.
*F16D 55/225* (2006.01)
*F16D 55/2265* (2006.01)
*F16D 65/097* (2006.01)

(52) U.S. Cl.
CPC ......... *F16D 65/0977* (2013.01); *F16D 66/02* (2013.01); *F16D 65/097* (2013.01); *F16D 65/0978* (2013.01); *F16D 65/0979* (2013.01)

(58) Field of Classification Search
USPC ............................................. 188/92.3, 73.38
See application file for complete search history.

(56) References Cited

U.S. PATENT DOCUMENTS

| | | | | |
|---|---|---|---|---|
| 7,040,464 | B1* | 5/2006 | Andrews | F16D 65/0978 188/73.38 |
| 7,455,153 | B2* | 11/2008 | Ooshima | F16D 65/0972 188/18 A |
| 8,376,092 | B2* | 2/2013 | Lethorn | F16D 65/0972 188/72.3 |
| 8,540,060 | B2* | 9/2013 | Hayashi | F16D 65/097 188/1.11 W |
| 9,388,869 | B2* | 7/2016 | Zhang | F16D 65/0972 |
| 2010/0187050 | A1 | 7/2010 | Hayashi et al. | |
| 2011/0056778 | A1 | 3/2011 | Roth et al. | |
| 2012/0205205 | A1* | 8/2012 | Lethorn | F16D 65/0977 188/234 |

FOREIGN PATENT DOCUMENTS

| | | |
|---|---|---|
| JP | 8-42608 | 2/1996 |
| JP | 2000-179593 | 6/2000 |
| JP | 2010-169149 | 8/2010 |
| JP | 2010-281370 | 12/2010 |

OTHER PUBLICATIONS

International Search Report issued Nov. 5, 2013 in International Application No. PCT/JP2013/075694.

* cited by examiner

DISC BRAKE

TECHNICAL FIELD

The present invention relates to a disc brake for applying a braking force to, for example, a vehicle such as an automobile.

BACKGROUND ART

In general, a disc brake to be mounted to a vehicle such as an automobile includes a mounting member fixed to a non-rotating portion of the vehicle and formed over an outer circumferential side of a disc, a caliper arranged on the mounting member so as to be movable in an axial direction of the disc, a pair of friction pads mounted movably to the mounting member so as to be pressed against both surfaces of the disc by the caliper, and return springs made of a metal plate, which are arranged between the friction pads and the mounting member, for biasing the friction pads in a return direction in which the friction pads are separated away from the disc (Patent Literature 1).

When a driver of a vehicle or the like performs a brake operation, pistons provided to, for example, the caliper are slid to be displaced toward the disc by supplying a hydraulic pressure from exterior so that the friction pads are pressed against the disc by the pistons. As a result, a braking force is applied to the disc. On the other hand, when the brake operation is released, the supply of the hydraulic pressure to the pistons is stopped. Hence, the friction pads are returned by the return springs to return positions separated away from the disc.

CITATION LIST

Patent Literature

Patent Literature 1: JP 2010-169149 A

SUMMARY OF INVENTION

In the case of the related art described above, the return spring has a configuration in which a distal end side is elastically brought into abutment on the mounting member side at a position on an inner side in a disc radial direction relative to a base end side fixed to a back plate of the friction pad. In this case, due to a biasing force of the return spring, an attitude of the friction pad at the return position tends to be inclined so that an outer side thereof in the disc radial direction comes closer to the disc. As a result, there is a fear in that the outer side and the disc are likely to drag.

The present invention has been made in view of the above-mentioned problem of the related art, and has an object to provide a disc brake capable of reducing drag between a radially outer side of a friction pad and a disc.

In order to solve the problem described above, the present invention is applied to a disc brake, including: a mounting member sized to a non-rotating portion of a vehicle and formed over an outer circumferential side of a disc; a caliper arranged on the mounting member so as to be movable in an axial direction of the disc; a pair of friction pads mounted movably to the mounting member so as to be pressed against both surfaces of the disc by the caliper; and return springs made of a metal plate respectively arranged between the pair of friction pads and the mounting member, for biasing the pair of friction pads in a return direction in which the pair of friction pads are separated away from the disc.

Further, the feature of the configuration employed in the present invention resides in that each of the return springs has a base end side fixed to a back plate of each of the pair of friction pads and a distal end side elastically brought into abutment on the mounting member side at a position on an outer side in a disc radial direction relative to the base end side.

According to the present invention, it is possible to reduce the drag between the radially outer side of the friction pad and the disc.

EMBODIMENTS

Figure 1:
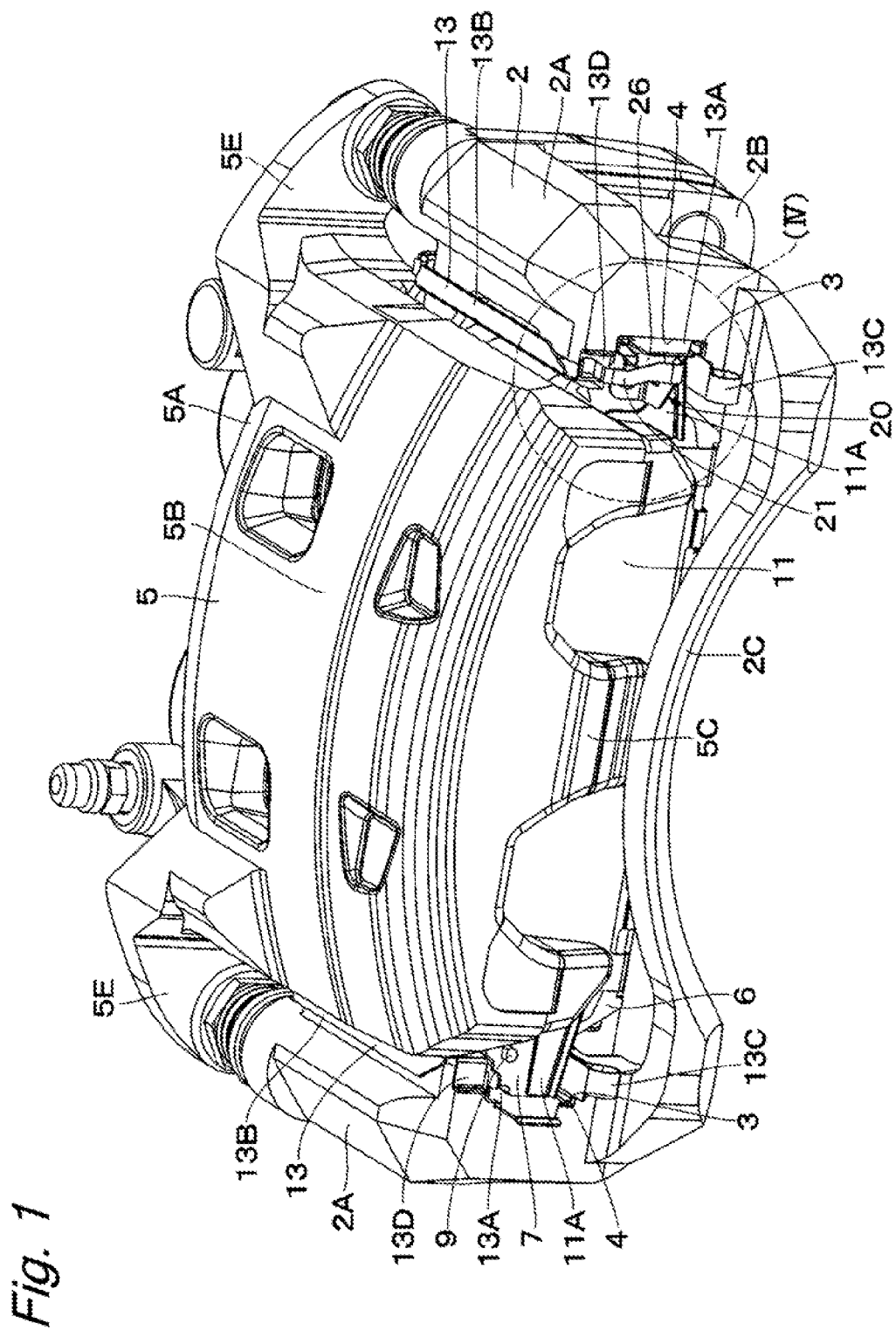
FIG. 1 is a perspective view illustrating a disc brake according to a first embodiment of the present invention when viewed from above (outer side in a disc radial direction).

Now, a disc brake according to a first embodiment of the present invention is described in detail referring to the accompanying drawings.

A disc 1 (see FIGS. 2 and 10), which rotates with a wheel (not shown), rotates, for example, in a direction indicated by the arrows A (see FIG. 2) when a vehicle runs in a forward direction and rotates in a direction indicated by the arrows B (see FIG. 2) when the vehicle runs backward.

A mounting member 2 referred to as "carrier" is fixed to a non-rotating portion (not shown) of the vehicle and is formed over an outer circumferential side of the disc 1. Here, the mounting member 2 mainly includes a pair of arm portions 2A and 2A, a bearing portion 2B, and a reinforcing beam 2C. The arm portions 2A and 2A are separated away from each other in a rotating direction of the disc 1 (horizontal direction in FIGS. 2 and 3; referred to as "disc rotating direction", "disc tangential direction", or "disc circumferential direction" in this application) to extend in an axial direction of the disc 1 (front and back direction in FIGS. 2 and 3; referred to as "disc axial direction" in this application) over an outer circumference of the disc 1.

The bearing portion 2B is formed so as to connect base end sides of the arm portions 2A integrally and is fixed to the non-rotating portion of the vehicle at a position on an inner side of the disc 1. The reinforcing beam 2C couples distal end sides of the arm portions 2A at positions on the outer side of the disc 1. In this manner, the arm portions 2A of the mounting member 2 are coupled integrally by the bearing portion 2B on the inner side of the disc 1 and are coupled integrally by the reinforcing beam 2C on the outer side.

In an intermediate portion of each of the arm portions 2A of the mounting member 2 in the disc axial direction, a disc path portion (not shown) extending in an arc-like shape along the outer circumference (locus of rotation) of the disc 1 is formed. On both sides of the disc path portion of the mounting member 2 (both sides in the disc axial direction), an inner-side pad guide 3 and an outer-side pad guide 3 are respectively formed.

In other words, the pad guides 3 and 3 are formed on the inner side and the outer side as supporting portions in disc circumferential direction portions of the mounting member 2 (on both sides in the disc circumferential direction). The pad guides 3 and 3 are formed as rectangular concave grooves respectively having cross sections parallel to the disc 1, which are open on the sides opposed to each other, and extend in a direction in which friction pads 6 described later slide to be displaced, that is, in the disc axial direction.

The pad guides 3 guide the friction pads 6 in the disc axial direction through ear portions 7B and 7C of back plates 7 respectively included in the friction pads 6. Therefore, the ear portions 7B and 7C of the friction pad 6 (back plate 7) are inserted (recess/projection fitted) into each of the pad guides 3 so as to be interposed in the radial direction of the disc 1 (vertical direction in FIGS. 2 and 3; referred to as "disc radial direction" in this application).

A depth-side wall surface of each of the pad guides 3 forms a torque receiving surface 4 as a so-called torque receiving portion. The torque receiving surface 4 receives a braking torque that is received by the friction pad 6 from the disc 1 at the time of a brake operation through the ear portions 7B and 7C of the friction pad 6 and a guide plate portion 13A of a pad spring 13 described later.

A caliper 5 is arranged on the mounting member 2 so as to be movable in the disc axial direction. The caliper 5 includes an inner leg portion 5A, a bridge portion 5B, and an outer leg portion 5C. The inner leg portion 5A is formed on the inner side, which is one side in the axial direction of the disc 1. The bridge portion B is formed between the arm portions 2A of the mounting member 2 so as to be exceeded over the outer circumferential side of the disc 1 from the inner leg portion 5A to the outer side, which is another side in the axial direction of the disc 1. The outer leg portion 5C extends inwardly in the disc radial direction from the outer side, which is a distal end side of the bridge portion 5B, and has a plurality of claw portions on a distal end side.

Two cylinders (not shown), which become a twin bore, are arranged on the inner leg portion 5A of the caliper 5 side by side in the disc rotating direction. In each of the cylinders, a piston 5D (see FIGS. 2 and 10) is slidably inserted. A pair of mounting portions 5E and 5E projecting in the disc rotating direction is formed integrally on the inner leg portion 5A, as illustrated in FIGS. 1 and 3. The mounting portions 5E and 5E slidably support the entire caliper 5 to the respective arm portions 2A of the mounting member 2 through sliding pins (not shown).

Figure 6:
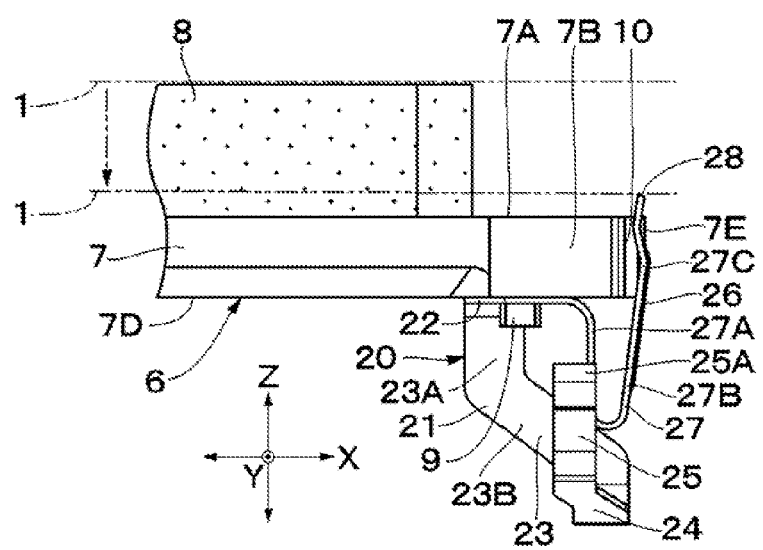
FIG. 6 is a plan view illustrating the outer-side friction pad and the spring forming member in an enlarged manner when viewed in the direction VI-VI in FIG. 5.
Figure 7:
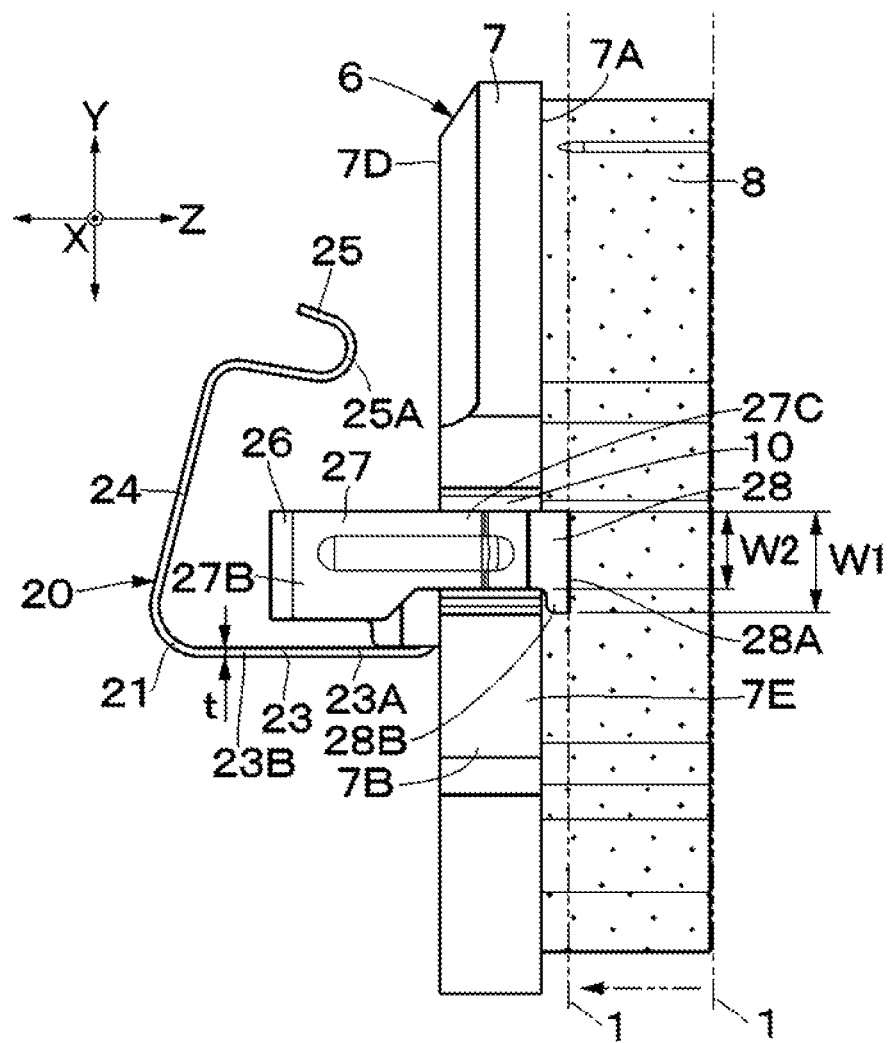
FIG. 7 is a side view illustrating the outer-side friction pad and the spring forming member in an enlarged manner when viewed in the direction VII-VII in FIG. 5.
Figure 8:
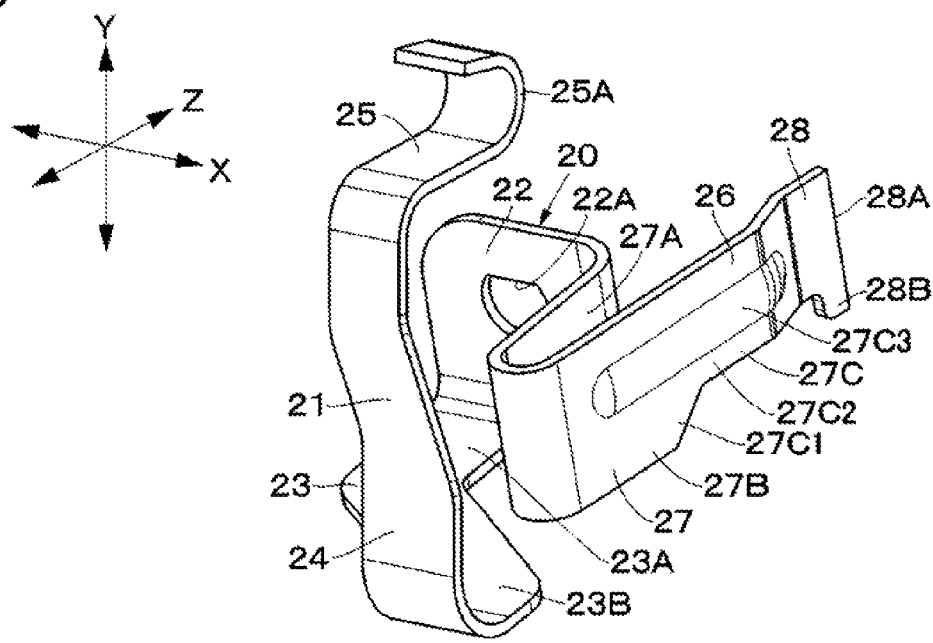
FIG. 8 is a perspective view of the spring forming member extracted so as to be illustrated as a single member.
Figure 9:
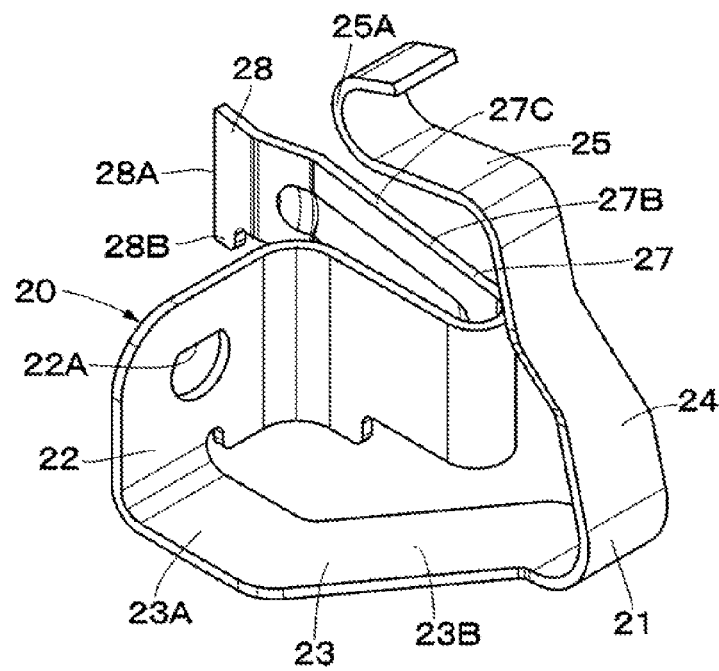
FIG. 9 is a perspective view of the spring forming member extracted so as to be illustrated as a single member when viewed from the left side of FIG. 8.

The inner-side friction pad 6 and the outer-side friction pad 6 are arranged so as to be opposed to both side surfaces of the disc 1 in the axial direction. The friction pads 8 are mounted to the mounting member 2 so as to be movable in the disc axial direction and are pressed against both surfaces of the disc 1 by the caliper 5. Here, as illustrated in FIGS. 5 to 7, each of the friction pads 6 mainly includes the flat-plate like back plate 7 extending in the disc rotating direction and a lining 8 as a friction material that is bonded (firmly fixed) to a disc opposed surface 7A of surfaces of the back plate 7 and is brought into frictional contact with a surface (side surface in the axial direction) of the disc 1 The back plate 7 may be formed of a metal, a resin, or the like.

The back plate 7 of each of the friction pads 6 has the ear portions 7B and 7C as fitting portions, each having a convex shape, which are located at side edge portions on both sides in the disc circumferential direction. The ear portions 7B and 7C are slidably inserted into the pad guides 3 of the mounting member 2 through the guide plate portions 13A of the pad springs 13, which are described later. Then, the ear portions 7B and 7C serves as a torque transmitting portion for transmitting the braking torque received by the friction pad 6 from the disc 1 at the time of a vehicle brake operation to the torque receiving surface 4 of the mounting member 2 (through the pad spring 13).

Figure 5:
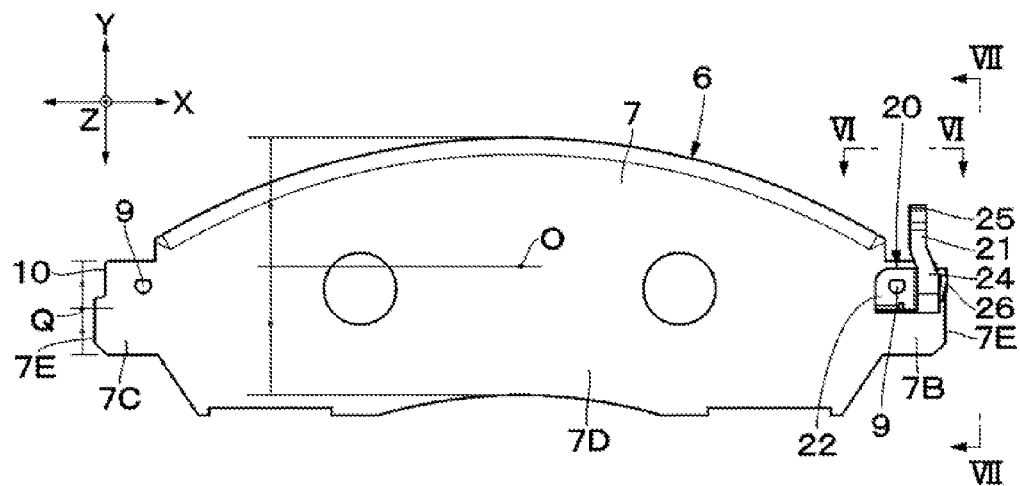
FIG. 5 is a front view illustrating an outer-side friction pad and the spring forming member in an enlarged manner when viewed in the same direction as that in FIG. 2.

The ear portions 7B and 7C of the friction pad 5 (back plate 7) are formed horizontally symmetrical and have the same shape, as illustrated in FIG. 5, for example. Here, one ear portion 7B (on the right in FIG. 5) is arranged on an inlet side (leading side) in the rotating direction of the disc 1 that rotates in the direction indicated by the arrows A when the vehicle runs forward, whereas another ear portion 7C (on the left in FIG. 5) is arranged on an outlet side (trailing side) in the rotating direction of the disc 1. A spring forming member 20 including a return spring 21 described later is mounted to the one ear portion 7B of the ear portions 7B and 7C, which is located on the leading side of the disc 1. In the first embodiment, the spring forming member 20 is arranged only on the leading side of the disc 1 and is not arranged on the trailing side. However, the spring forming member may also be arranged on the trailing side as needed.

Projections 9 and 9 are formed on the back plate 7 of each of the friction pads 6 so as to be located closer to base ends (bases) of the ear portions 7B and 7C. The projections 9 are formed on a rear surface 7D of the back plate 7 (surface on the side opposite to the disc opposed surface A on which the lining 8 is formed; back surface) so as to project therefrom and are formed so as to have a non-circular (segmental circular) sectional shape. One projection 9 of the projections 9, which is located on the leading side of the disc 1, is formed so as to position the spring forming member 20 described later with respect to the back plate 7. Specifically, a caulking hole 22A of the spring forming member 20 is engaged with (coupled by caulking to) one of the projections 9.

On opposed surfaces 7E of the ear portions 7B and 7C of the back plate 7, which face the torque receiving surface 4 of the pad guide 3, level-difference portions 10 and 10 are respectively formed. Each of the level-difference portions 10 is formed by partially cutting the opposed surface 7E that is a distal-end side (projecting side) end surface of each of the ear portions 7B and 7C in an L-like shape. The level-difference portions 10 are arranged at positions closer to the outer side in the radial direction than a central position (see the point Q in FIG. 5) in a width direction (disc radial direction) of the ear portions 7B and 7C.

The level-difference portion 10 of the level-difference portions 10, which is located on the leading side of the disc 1, forms a receiving gap for receiving a part of a side pressure spring 26 that is formed integrally with the return spring 21 described later. The side pressure spring 26 is arranged on the level-difference portion 10 so as to extend in the disc axial direction. In this case, a portion (projecting portion 28B) of a vibrating portion 28 that corresponds to a distal end of the side pressure spring 26 is located between the disc opposed surface 7A of the back plate 7 and the disc 1. In the first embodiment, the distal end of the side pressure spring 26 also has a wear detecting function for the lining 8, and therefore the distal end of the side pressure spring 26 is extended to be located between the disc opposed surface 7A and the disc 1. When the distal end of the side pressure spring 26 does not have the wear detecting function, however, the distal end of the side pressure spring 26 is not required to be extended to be located between the disc opposed surface 7A and the disc 1.

Shim plates 11 and 12 for preventing squeal are mounted removably to each of the inner-side friction pad 6 and the outer-side friction pad 6 so as to be located on the rear surface 7D side of the back plate 7. The outer-side shim plate 11 is arranged between the outer leg portion 5C of the caliper 5 and the back plate 7 so as to prevent the two from being brought into direct contact with each other, to thereby suppress the generation of so-called brake squeal between the two. On the other hand, the inner-side shim plate 12 is arranged between the piston 5D inserted into the inner leg portion 5A of the caliper 5 and the back plate 7 so as to prevent the direct contact between the two, to thereby suppress the generation of brake squeal between the two.

Here, the outer-side shim plate 11 has extended portions 11A for preventing turning-up, which are located on both side in the disc rotating direction to extend in the disc tangential direction. Each of the extended portions 11A prevents the shim plate 11 from being further displaced (turned up) in the disc rotating direction with respect to the friction pad 6 by abutment of a distal end side thereof on the torque receiving surface 4 of the mounting member 2 (through the guide plate portion 13A of each of the pad springs 13).

To the arm portions 2A of the mounting member 2, the pad springs 13 and 13 are respectively mounted. The pad springs 13 elastically support the inner-side and outer-side friction pads 6, respectively, and smoothen sliding displacement of the friction pads 6. The pad springs 13 are formed by bending (pressing) a plats material made of a metal such as a stainless steel plate having a spring property.

Each of the pad springs 13 includes the pair of guide plate portions 13A, a connecting plate portion 13B, radial-direction biasing plate portions 13C, and abutment plate portions 13D (abutment plate). The pair of guide plate portions 13A are formed so as to be bent into a shape along the pad guide 3 and fitted into each of the pad guides 3 of the mounting member 2, and are formed so as to be separated away from each other on the inner side and the outside of the disc 1.

Figure 4:
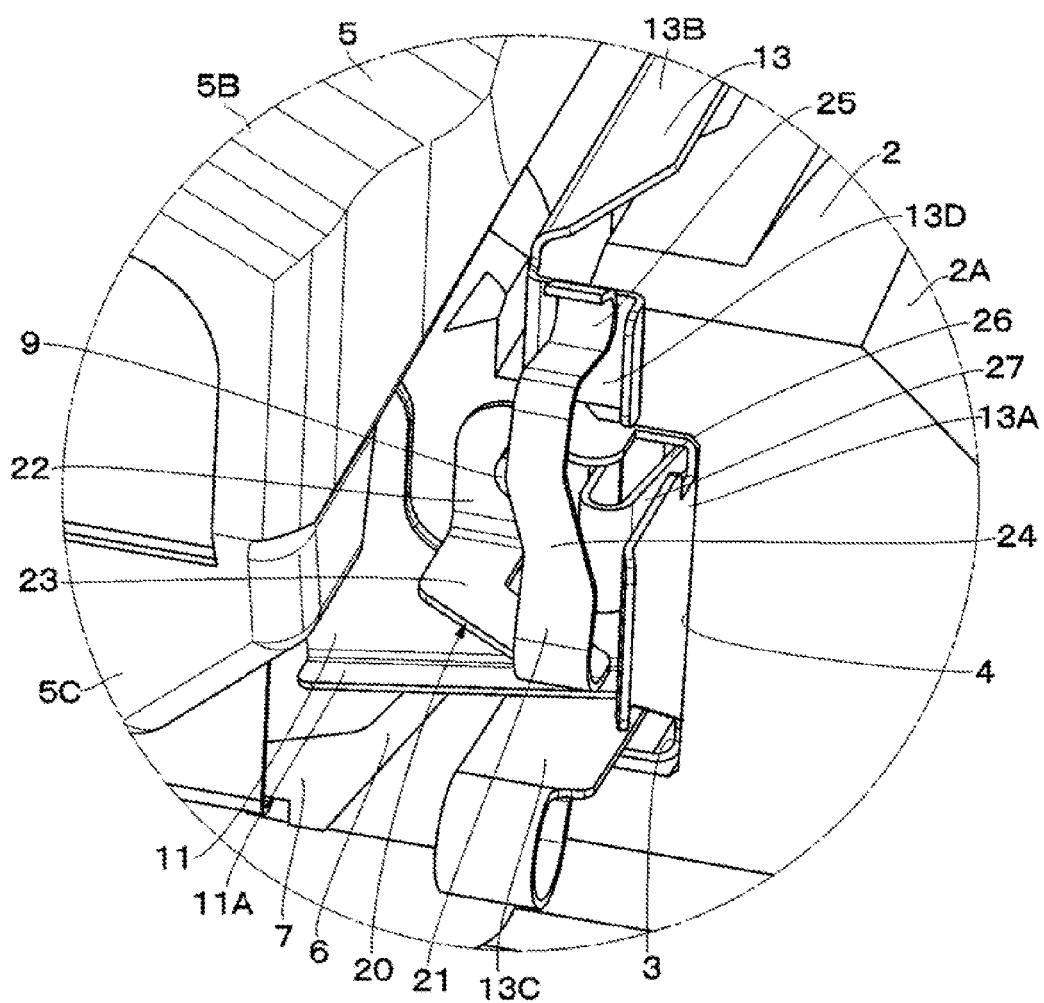
FIG. 4 is an enlarged view of a portion (IV) illustrated in FIG. 1, for illustrating a mounting member, a caliper, a friction pad, a pad spring, a spring forming member.

The connecting plate portion 13B is formed so as to extend in the axial direction over the outer circumferential side of the disc 1, to thereby connect integrally the guide plate portions 13A on the inner side and the outer side of the disc 1. The radial-direction biasing plate portion 13C is formed integrally with an inner portion of each of the guide plate portions 13A in the disc radial direction. The abutment plate portions 13D are formed on both sides of the connecting plate portion 13B in the disc axial direction, as illustrated in detail in FIG. 4, and are formed integrally with the connecting plate portion 13B so as to be bent at approximately 90 degrees and extend in the disc rotating direction.

The guide plate portions 13A of the pad spring 13 are fitted to be mounted in each of the pad guides 3 of the mounting member 2 and have a function of guiding the back plates 7 of the friction pads 6 in the disc axial direction through the convex-shaped ear portions 7B and 7C. The radial-direction biasing plate portions 13C extend in the disc axial direction from the inner portion of the guide plate portion 13A in the disc radial direction and then change the orientation at approximately 360 degrees in an arc-like shape so that distal ends thereof extend to the inner side of the ear portions 7B and 7C of each of the friction pads 6 (back plate 7) in the disc radial direction. With this, the radial-direction biasing plate portions 13C are elastically brought into abutment on the ear portions 7B and 7C of each of the friction pads 6 (back plate) inside each of the pad guides 3 of the mounting member 2. In this manner, the back plate 7 of each of the friction pads 6 is biased outward in the disc radial direction. As a result, the friction pads 6 can be smoothly guided in the disc axial direction along the guide plate portions 13A at the time of the brake operation, while suppressing rattling of each of the friction pads 6.

The abutment plate portion 13D of the pad spring 13 corresponds to a receiving seat surface on which a distal end side (folded portion 25A) of the return spring 21 described later is brought into abutment in an elastically deformed state. Here, the abutment plate portion 13D is extended from the pad spring 13 for receiving a torque in the disc rotating direction together with the back plate 7 of the friction pad 6. In the case of the first embodiment, the abutment plate portions 13D are formed on both the leading-side pad spring 13 and the trailing-side pad spring 13. However, the configuration may be such that the abutment plate portion 13D is formed only on the leading-side pad spring 13, on which the return spring 31 is arranged. Specifically, for the trailing-side pad spring 13 on which the return spring 21 is not arranged, the abutment plate portion 13D may be omitted. In view of the common use of a component between the leading-side pad spring 13 and the trailing-side pad spring 13 and facilitation of assembly work, however, it is preferred to incorporate the pad springs 13, each having the abutment plate portion 13D, on both the leading-side and the trailing-side, as in the first embodiment.

Next, the return spring 21 for biasing the friction pad 6 in a return direction of separating away from the disc 1 is described. In the first embodiment, the side pressure spring 26 is arranged on the return spring 21 so that the return spring 21 and the side pressure spring 26 are formed integrally. The side pressure spring 26 of the first embodiment biases the friction pad 6 in the disc circumferential direction (disc tangential direction) and warns a driver or the like that replacement timing of the friction pad 6 has come (the lining 8 is worn to the wear limit).

Specifically, the return spring 21 forms the spring forming member 20 together with the side pressure spring 26. The spring forming member 20 is formed as a integrally formed spring member made of a metal, including the return spring 21 having a function of retuning the friction pad 6 to the return position that is away from the disc 1 (return function), and the side pressure spring 26 having two functions, which are a function of pressing the friction pad 6 in the disc tangential direction (disc rotating direction) (side pressing function) and a function of warning of the wear limit of the lining 8 (wear detecting function), thereby providing a total of three functions. In the first embodiment described above, the example where the integrally formed spring member made of a metal, which has the three functions, is used to enhance low cost characteristics and ease of assembly has been described. However, the three functions may be provided separately. Further, the side pressing function and the wear detecting function may be omitted.

The spring forming member 20 is arranged on a side edge portion (ear portion 7B) of side edge portions (ear portions 7B and 7C) of the back plate 7 forming each of the inner-side and outer-side friction pads 6, which is located on the disc leading side when the vehicle runs forward. The inner-side spring forming member 20 and the outer-side spring forming member 20 have the same configuration except for a difference in the formation of a spring material 101 described later by bending a front side and a back side in an opposite manner. In the following description, the outer-side spring forming member 20 is mainly described.

The return spring 21 included in the spring forming member 20 is arranged between the friction pad 6 and the mounting member 2, more specifically, between the ear portion 7B on the disc leading side and the pad spring 13 mounted to the mounting member 2. The return spring 21 biases the friction pad 6 in the return direction of separating away from the disc 1 and is formed by bending the spring material 101 made of a metal plate illustrated in FIG. 11 together with the side pressure spring 26.

The return spring 21 has a base end side fixed to the back plate 7 of the friction pad 6 and a distal end side elastically brought into abutment on the mounting member 2 side on the outer side in the disc radial direction relative to the base end side. Therefore, the return spring 21 includes a fixed portion 22, a first extended portion 23, a second extended portion 24, and an abutment portion 25.

The fixed portion 22 having a fiat plate-like shape is fixed by caulking to the projection 9 of the friction pad 6 (back plate 7) on the ear portion 7B side so as to be positioned in a direction including the rotating direction. For this purpose, in approximately center of the fixed portion 22, the non-circular caulking hole 22A, into which the projection 9 of the ear portion 7B is inserted, is formed by drilling. The fixed portion 22 is formed on one end side of the return spring 21 and is fixed to a fiat surface (back surface 7D) of the friction pad 6, which is on the side opposite to the disc abutment surface.

The first extended portion 23 is formed by bending into an L-like shape so as to rise vertically from the fixed portion 22 and has a distal end side that is extended in a direction vertically away from the surface of the disc 1. Specifically, the first extended portion 23 has the base end side, which corresponds to a rising portion 23A to extend in the disc axial direction, and a distal end side from the middle portion, which corresponds to an inclined portion 23B to extend obliquely with respect to the disc axial direction, specifically, in a direction closer to the torque receiving surface 4 of the mounting member 2.

The second extended portion 24 is formed by bending outward a distal end side of the first extended portion 23 at an acute angle or a right angle (about 45 to 90 degrees) in the disc radial direction and in a direction closer to the abutment plate portion 13D of the pad spring 13 and extends outward in the disc radial direction toward the abutment plate portion 13D of the pad spring 13. The abutment portion 25 is formed on another end side of the return spring 21 and is elastically brought into abutment on the mounting member 2 side. Specifically, the abutment portion 25 is formed by bending the distal end side of the second extended portion 24 at an approximately right angle (70 to 90 degrees) toward the abutment plate portion 13D of the pad spring 13. The folded portion 25A is folded into an U-like shape, which corresponds to a distal end side thereof, is elastically brought into abutment on the abutment plate portion 13D of the pad spring 13. In this manner, the return spring 21 has the distal end side (abutment portion 25) that is elastically brought into abutment on the mounting member 2 side (pad spring 13) at a position on the outer side in the disc radial direction relative to the base end side (fixed portion 22).

A further detailed description is given. The first extended portion 23 of the return spring 21 has the distal end side that is formed integrally with the fixed portion 22 and is oriented in the Y-axis direction exemplarily illustrated in FIGS. 5 to 8 so that a direction of a plate thickness t (see FIG. 7) approximately corresponds to the radial direction of the disc 1. Specifically, when an axis extending in a horizontal direction that is perpendicular to the Y-axis is the X-axis and a direction that is perpendicular to both the X-axis and the Y-axis is the Z-axis, the first extended portion 23 is formed so as to extend to rise from the fixed portion 22 in the Z-axis direction and have a plate width direction in the X-axis direction and a direction of the plate thickness t in the Y-axis direction.

Figure 2:
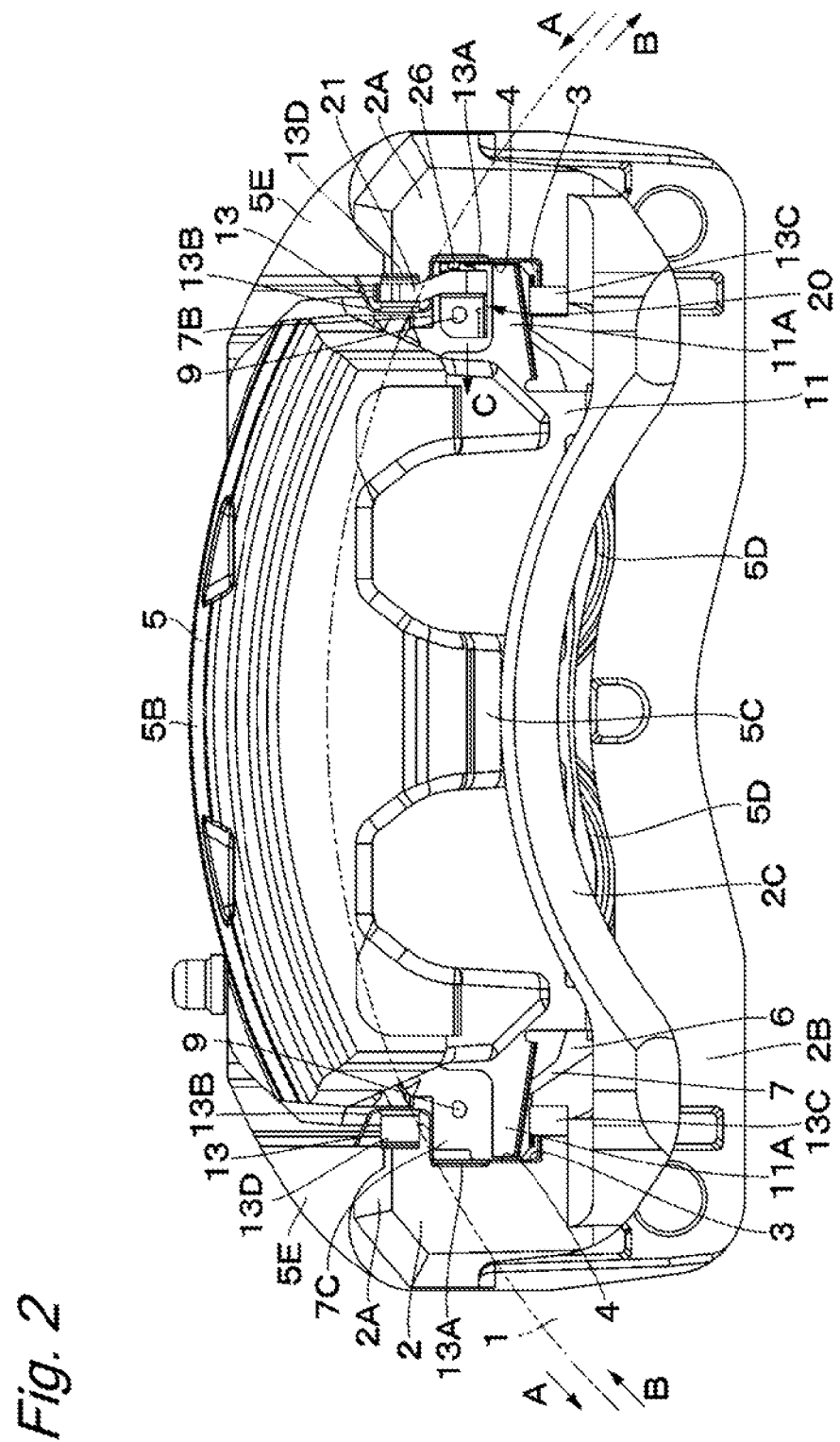
FIG. 2 is a front view illustrating the disc brake when viewed from an outer side.
Figure 3:
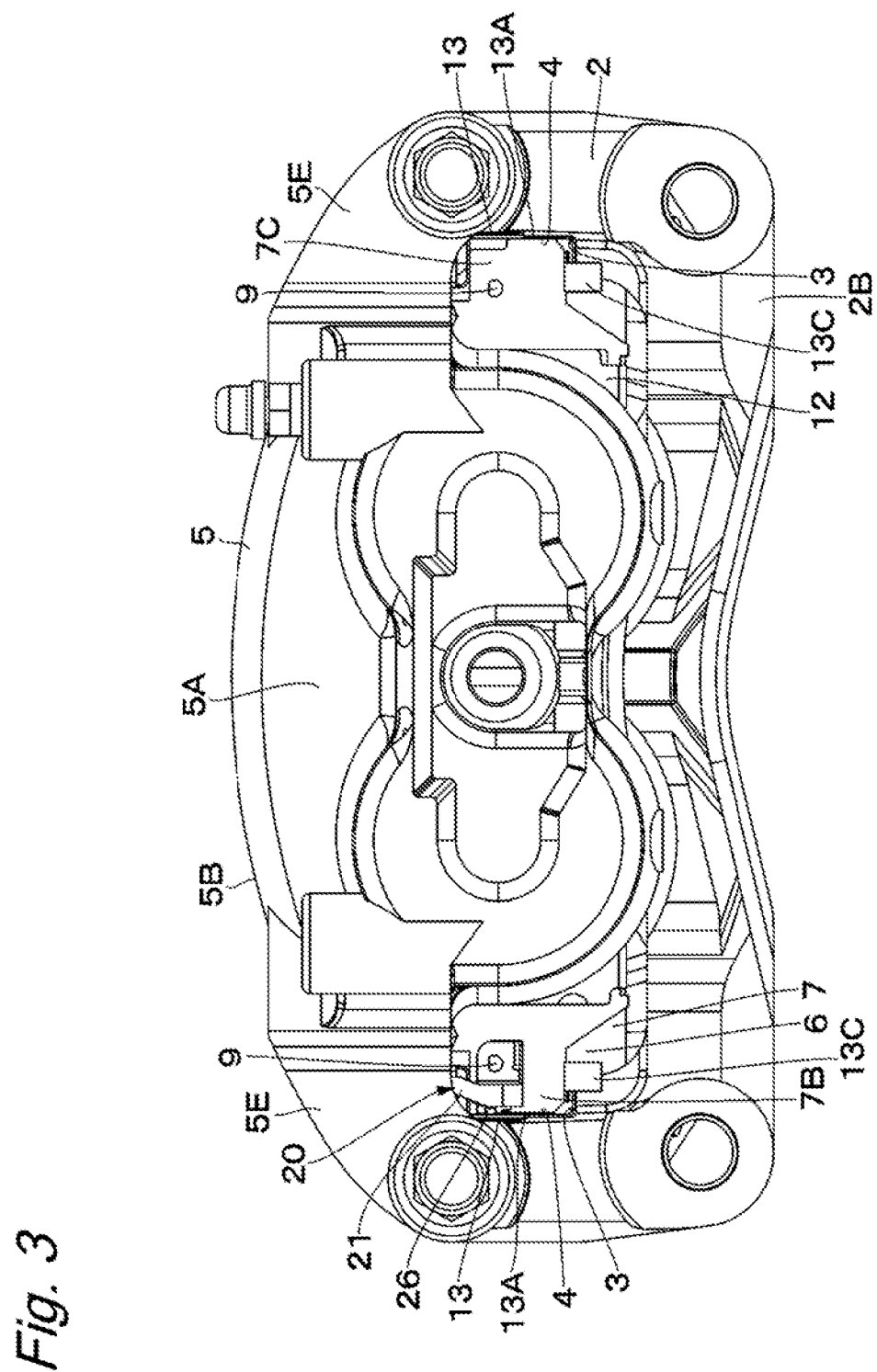
FIG. 3 is a back view illustrating the disc brake when viewed from an inner side.

In this case, the X-axis direction corresponds to an approximately circumferential direction (more precisely, the horizontal direction, the tangential direction) of the disc 1 rotating in the direction indicated by the arrows A or in the direction indicated by the arrows B in FIG. 2, the Y-axis direction corresponds to an approximately radial direction of the disc 1, and the Z-axis direction corresponds to the axial direction of the disc 1. Then, the fixed portion 22 of the return spring 21 is arranged in parallel to a plane formed by the X-axis and the Y-axis, and the plane thickness direction is oriented in the Z-axis direction.

Here, the distal end side of the first extended portion 23 from the middle portion thereof corresponds to the inclined portion 23B to extend obliquely with respect to the rising portion 23A on the base end side. In this manner, the return spring 21 offsets (shifts) the base end side (connecting portion between the fixed portion 22 and the rising portion 23A) in the tangential direction of the disc 1 (X-axis direction) relative to the distal end side (abutment portion 25) to avoid the interference with the side pressure spring 26 described later and adjust a spring force of the return spring 21.

Further, the second extended portion 24 is formed at the distal end of the first extended portion 23 so as to be bent in the Y-axis direction at a right angle or an acute angle (so as to partially contain a Z-axis direction component) to be extended toward the abutment plate portion 13D of the pad spring 13. In this manner, the second extended portion 24 is formed so as to pass on the outer side of the side pressure spring 26 in the disc axial direction to avoid the interference with the side pressure spring 26. Further, the abutment portion 25 is formed at the distal end of the second extended portion 24 so as to be bent in the Z-axis direction in as approximately L-like shape and brings the folded portion 25A on the distal end side, which is folded into the U-like shape, into abutment on the abutment plate portion 13D of the pad spring 13 with elasticity through line contact.

In this manner, the return spring 21 constantly biases the friction pad 6 (back plate 1) in the return direction that is away from the disc 1 so that the friction pad 6 can be stably returned to the return position (initial position; waiting position) when, for example, the vehicle brake operation is released. In this case, the abutment portion 25 of the return spring 21 on the distal end side is brought into abutment on the abutment plate portion 13D or the pad spring 13 on the mounting member 2 side with elasticity at a position on the outer side in the disc radial direction relative to the fixed portion 22 on the base end side. In this manner, an attitude of the friction pad 6 at the return position can be set so that the radially outer side tends to be inclined in the direction of separating away from the disc 1 as compared with the radially inner side, in other words, tends to be open outward (open upward). In the present invention, the outward opening (upward opening) is not necessarily required as long as an inward opening (downward opening) tendency can be suppressed.

Figure 10:
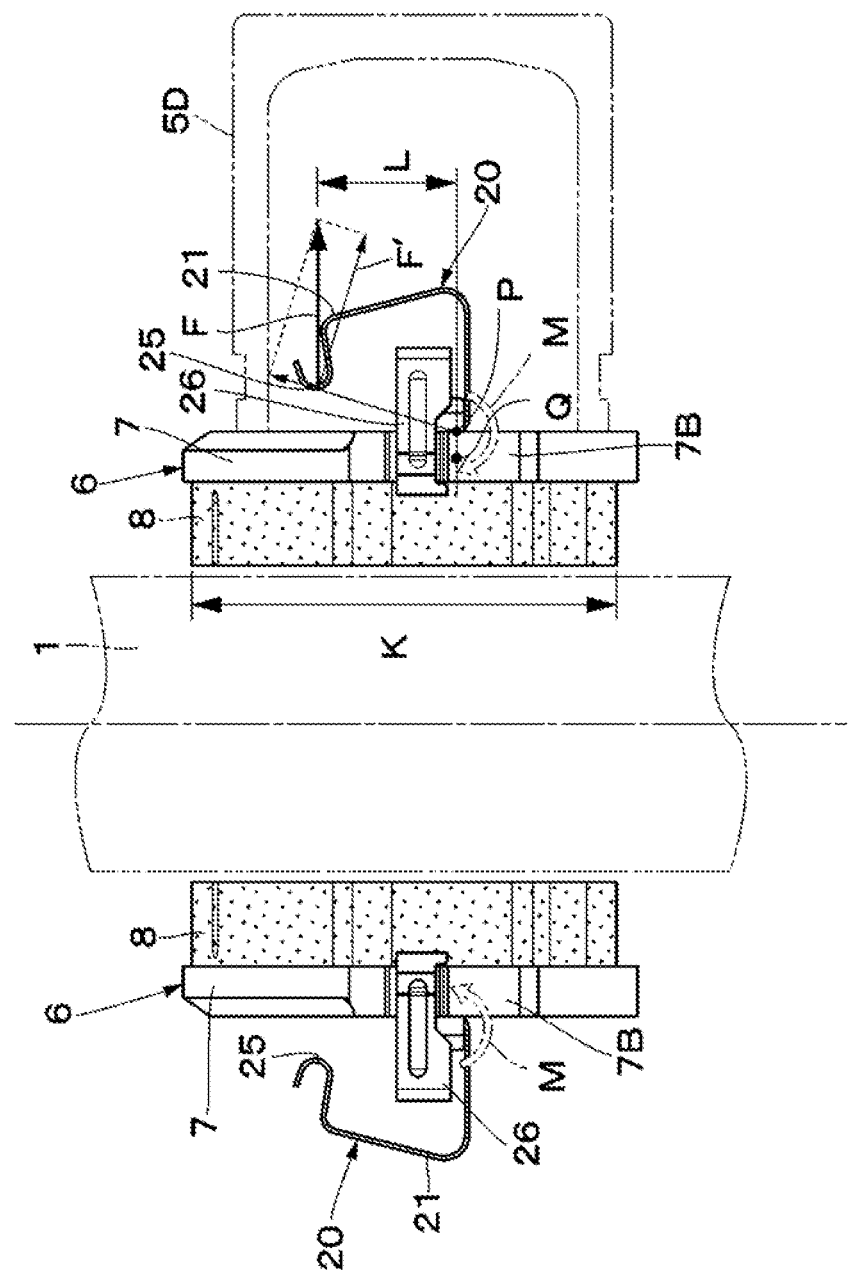
FIG. 10 is a side view illustrating a force applied to the friction pad based on a biasing force of a return spring.

Specifically, as illustrated in FIG. 10, a load F is applied to the abutment portion 25 of the return spring 21 in the disc axial direction by the abutment on the abutment plate portion 13D of the pad spring 13. As a result, based on a component F' of the load F, a moment M having a point P of effort as a center corresponding to a coupled portion (fixed portion) between the ear portion 7B of the friction pad 6 and the fixed portion 22 is applied to the friction pad 6. The moment M is a force for inclining the attitude of the friction pad 6 in the direction in which the radially outer side separates away from the disc 1 as compared with the radially inner side. As a result, the radially outer side of the friction pad 6 tends to separate away from the disc 1. Therefore, the drag between the radially outer side of the friction pad 6 and the disc 1 can be reduced. In FIG. 10, the reference symbol Q indicates a center of the ear portion 7B in the radial direction (center of a guide sliding portion). When a radial, dimension of the lining 8 is represented by K and a distance dimension between the point P of effort and the abutment portion 25 is represented by L, K>L holds. Therefore, the point P of effort falls within the range of the dimension K.

In the first embodiment, the example where the return spring 21 is arranged only on the leading side has been described. This is because the leading side is drawn into the disc brake. As a result, the trailing side tends to be open as compared with the leading side. Therefore, hitherto, the radially inner side on the leading side tends to be most worn. Therefore, in the first embodiment, the problem is solved by arranging the return spring 21 only on the leading side. For example, in a structure in which a diameter of the piston 5D on the trailing side is increased so as to uniformize the wear tendency on the leading side and the trailing side, the return springs 21 may be arranged on both the leading side and the trailing side.

Next, the side pressure spring 26 that is arranged integrally with the return spring 21 is described.

The side pressure spring 26 is included in the spring forming member 20 together with the return spring 21. The side pressure spring 26 is arranged between the ear portion 7B, which corresponds to the disc leading side when the vehicle runs forward, and the torque receiving surface 4 of the mounting member 2, which is opposed thereto. The side pressure spring 26 has a pressing function of biasing the pad guide 3 to press the friction pad 6 in the disc circumferential direction (to the trailing side of the disc 1). At the same time, the side pressure spring 26 has a function of warning the driver or the like of the wear limit of the lining 8 by generating noise when the distal end formed between the back plate 7 of the friction pad 6 and the disc 1, that is, the vibrating portion 28 (distal end 28A thereof) is brought into contact with the disc 1.

The side pressure spring 26 mainly includes the fixed portion 22 shared by the return spring 21, a pressing portion 27, and the vibrating portion 28. The fixed portion 22, the pressing portion 27, and the vibrating portion 28 are formed integrally. The pressing portion 27 is formed so as to be bent from the fixed portion 22 to have a U-like cross section on the rear surface 7D side of the back plate 7, and includes a bent piece portion 27A, a folded portion 27B, and an abutment portion 27C.

The bent piece portion 27A is formed at a position away from the first extended portion 23 of the return spring 21 in the X-axis direction and the Y-axis direction so as to be bent into an L-like shape and rise vertically from the fixed portion 22, and has a distal end side extending in the Z-axis direction vertically away from the surface of the disc 1. Specifically, the bent piece portion 27A is arranged so as to have a positional relationship to be approximately perpendicular to the first extended portion 23 and extends approximately in parallel to the plane formed by the Y-axis and the Z-axis.

The folded portion 27B is formed by folding the distal end side of the bent piece portion 27A in an approximately U-like shape and extends in a direction opposite to the Z-axis direction. The abutment portion 27C is connected to the distal end side of the folded portion 27B and extends from the distal end side toward the disc opposed surface 7A side of the back plate 7 in the direction closer to the disc 1.

Here, the abutment portion 27C includes a tapered portion 27C1 having a width dimension decreasing toward the disc 1 and a constant-width portion 27C2 extending toward the disc 1 with a width dimension remaining unchanged (constant). The abutment portion 27C has a projecting portion 27C3 formed over a region from the tapered portion 27C1 to the constant-width portion 27C2.

The abutment portion 27C (projecting portion 27C3) is brought into abutment on (elastic contact with) the torque receiving portion 4 of the mounting member 2 in an elastically deformed state through the guide plate portion 13A of the pad spring 13. The pressing portion 27 of the side pressure spring 26 biases the friction pad 6 in the disc tangential direction, more specifically, to the trailing side of the disc 1 by the elastic contact of the abutment portion 27C with the torque receiving surface 4 through the pad spring 13. As a result, the friction pad 6 can be prevented from rattling in the disc tangential direction (circumferential direction) due to vibrations or the like generated when the vehicle runs, while brake squeal (low-pressure squeal) at the time of slow braking can be reduced.

The vibrating portion 28 included in the side pressure spring 26 extends from the distal end side of the pressing portion 27 (abutment portion 27C) toward the disc 1. The distal end 28A of the vibrating portion 28 is brought into contact with the side surface (surface) of the disc 1 in the axial direction to vibrate when the lining 8 of the friction pad 6 is worn to a preset predetermined portion (wear limit). As a result, the vibrating portion 28 generates noise (abnormal sound).

Specifically, as illustrated in FIGS. 6 and 7, when the lining 8 is worn so that the disc opposed surface 7A of the back plate 7 comes closer to the disc 1 at the time of braking, the distal end 28A of the vibrating portion 28 is brought info contact with the side surface of the disc 1 to generate noise. As a result, the driver or the like can be warned that the replacement timing of the friction pad 6 has come (the lining 8 is worn to the wear limit).

Here, as illustrated in FIG. 7, the vibrating portion 28 is formed so that a dimension W1 of the distal end 28A in the disc radial direction is larger than a dimension W2 of a portion of the side pressure spring 26 in the disc radial direction, for biasing the pad guide 3, specifically, the constant-width portion 27C2, which is a portion of the abutment portion 27C of the pressing portion 27 overlapping the ear portion 7B in the disc circumferential direction. Thus, the projecting portion 28B projecting inward in the disc radial direction is formed on the distal end 28A of the vibrating portion 28. As a result, as illustrated in FIG. 7, a portion (projecting portion 28B) of the vibrating portion 28 is interposed between the disc opposed surface 7A of the back plate 7 and the disc 1.

When the lining 8 is worn to the wear limit, the distal end 28A of the vibrating portion 28 is brought into contact with the side surface of the disc 1. At this time, the vibrating portion 28 has the plate thickness direction oriented in the X-axis direction (approximately circumferential direction of the disc 1) and therefore, is elastically deformed effortlessly in the same direction when, for example, the vibrating portion 28 is brought into contact with the disc 1 rotating in the direction indicated by the arrows A or the direction indicated by the arrows B illustrated in FIG. 2.

Further, the vibrating portion 28 includes the distal end 28A having the increased dimension W1 in the disc radial direction. Therefore, an area of contact between the distal end 28A and the disc 1 can be increased to ensure the generation of a warning sound and increase a sound volume. In addition, when the distal end 28A of the vibrating portion 28 is brought into contact with the side surface of the disc 1, a part (projecting portion 28B) of the distal end 28A is interposed between the disc opposed surface 7A of the back plate 7 and the side surface of the disc 1. As a result, the distal end 28A of the vibrating portion 28 is pressed against the side surface of the disc 1. Even from this viewpoint, the generation of the warning sound can be ensured and the sound volume can be increased.

Figure 11:
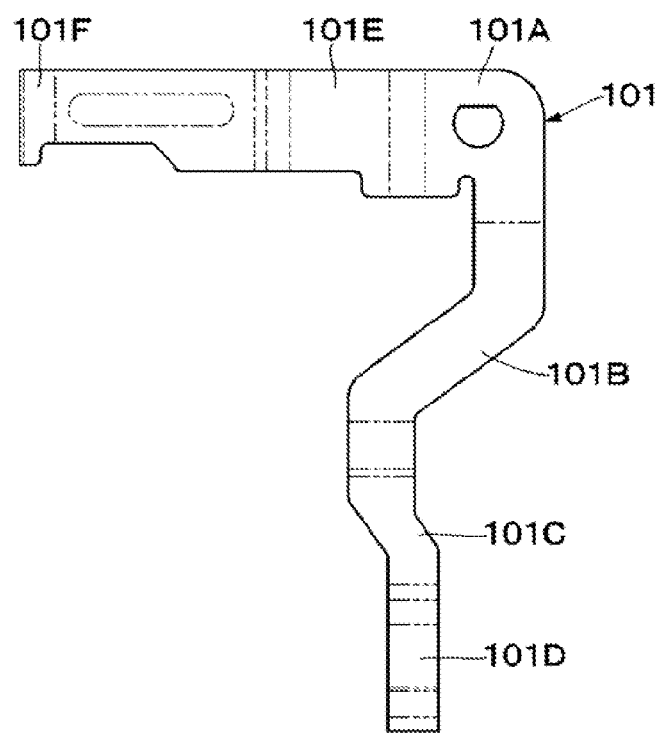
FIG. 11 is a developed view of the spring forming member.
Figure 12:
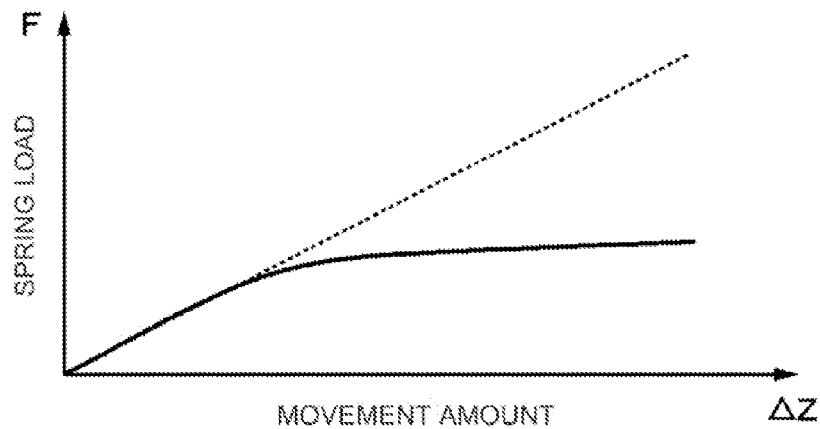
FIG. 12 is a comparison graph showing a relationship between a spring load and a pad movement amount of a return spring according to a second embodiment and a related-art return spring.

For the spring forming member 20 including the return spring 21 and the side pressure spring 26 that are formed integrally, a large number of the spring materials 101 as illustrated in FIG. 11 are formed by shaping a metal plate (not shown) having a spring property, such as a stainless steel plate, by means of pressing or the like. Then, each of the spring materials 101 includes a fixed portion 101A, a first extended portion 101B, a second extended portion 101C, an abutment portion 101D, a spring portion 101E, and a vibrating portion 101F.

Then, the fixed portion 101A, the first extended portion 101B, the second extended portion 101C, the abutment portion 101D, the spring portion 101E, and the vibrating portion 101F of the spring material 101 are subjected to pressing work (bending, drawing) to form each of the inner-side spring forming member 20 (the return spring 21 and the side pressure spring 26) and the outer-side spring forming member (the return spring 21 and the side pressure spring 26). At this time, the outer-side spring forming member 20 is formed by bending in the opposite direction to that of the inner-side spring forming member 20 when the spring material 101 is subjected to bending.

The disc brake according to the first embodiment has the configuration described above. Next, actuation thereof is described.

First, when the vehicle brake operation is performed, a brake fluid pressure is supplied to the inner leg portion 5A (cylinders) of the caliper 5 to slide and displace the pistons 5D toward the disc 1. In this manner, the inner-side friction pad 6 is pressed against one side surface of the disc 1. At this time, the caliper 5 is subjected to a pressing reaction force from the disc 1. Therefore, the entire caliper 5 slides and displaces toward the inner side relative to the arm portions 2A of the mounting member 2, and hence the outer leg portion 5C presses the outer-side friction pad 6 against another side surface of the disc 1.

As a result, the inner-side and outer-side friction pads 6 can firmly nip therebetween the disc 1 rotating in, for example, the direction indicated by the arrows A in FIG. 2 (when the vehicle is running forward) from both sides in the axial direction. Therefore, the braking force can be applied to the disc 1. Then, when the brake operation is released, the supply of the hydraulic pressure to the pistons 5D is stopped. As a result, the inner-side and outer-side friction pads 6 separate away from the disc 1 to return to a non-braking state again. At this time, the inner-side and outer-side friction pads 6 are stably returned by the return springs 21 to the return positions (initial positions; waiting positions) away from the disc 1.

At the time of performing the brake operation or releasing the brake operation (at non-braking time) as described above, the ear portion 7B of the ear portions 7B and 7C of the friction pad 6, which is located on the leading side of the disc 1, is biased in the direction C illustrated in FIG. 2 by the pressing portion 27 of the side pressure spring 26. The friction pad 6 is constantly biased to the trailing side of the disc 1 (in the direction indicated by the arrows A illustrated in FIG. 2) with a weak force. Then, the ear portion 7C located on the trailing side of the disc 1 is elastically pressed against the torque receiving surface 4 of the pad guide 3 through the guide plate portion 13A of the pad spring 13 by the biasing force at this time.

Therefore, the rattling of the friction pads 6 in the disc circumferential direction due to the vibrations or the like generated when the vehicle is running can be regulated by the side pressure spring 26 arranged between the ear portion 7B of the disc 1 on the leading side and the torque receiving surface 4. Then, during the brake operation performed when the vehicle is running forward, the braking torque received by the friction pads 6 from the disc 1 (rotation torque in the direction indicated by the arrows A) can be borne by the arm portion 2A on the trailing side (torque receiving surface 4 of the pad guide 3).

In this manner, the ear portion 7C of the friction pad 6, which is located on the trailing side of the disc 1, is continuously held in abutment on the torque receiving surface 4 of the pad guide 3 through the guide plate portion 13A. In addition, the ear portion 7C on the trailing side is brought into abutment on the guide plate portion 13A by the biasing force of the pressing portion 27 of the side pressure spring 26 before the brake operation, and is therefore in a state without a clearance (gap). Thus, the generation of an abnormal sound (rattling noise) due to the movement of the friction pads 6 caused by the braking torque can be suppressed. As a result, the brake squeal (low-pressure squeal) at the time of slow braking can be prevented.

On the other hand, when the lining 8 of each of the friction pads 6 is worn to the preset predetermined portion (wear limit) along with long-term use or the like, the position of the back plate 7 becomes closer to the disc 1 at the time of braking, as illustrated in FIGS. 6 and 7. In this case, the distal end 28A of the vibrating portion 28 of the side pressure spring 26 is brought into contact with the side surface (surface) of the disc 1 so generate a sound as the side pressure spring 26. In this manner, the driver or the like can be informed that the replacement timing of each of the friction pads 6 has come.

By the way, according to the related art, the distal end side of the return spring has a configuration in which the distal end side is elastically brought into abutment on the mounting member side at a position on an inner side in the disc radial direction relative to a base end side fixed to the back plate of the friction pad. With the configuration as described above, due to the biasing force of the return spring, the attitude of the friction pad at the return position tends to be open inward (open downward), that is, to be inclined so that an outer side thereof in the disc radial direction comes closer to the disc. As a result, there is a fear in that the outer side and the disc are likely to drag.

In other words, in the related art, the distal end side of the return spring presses the position that is located on the inner side in the disc radial direction to be offset from a centroid of the friction pad and a center of the guide sliding portion in the disc radial direction for guiding the friction pad in the axial direction to return the friction pad to the return position. Therefore, the attitude of the friction pad at the return position tends to be inclined in the direction in which the outer side in the disc radial direction becomes closer to the disc. As a result, when the drag occurs, an effective radius of the drag increases. For example, when the disc tends to be inclined to the outer side due to thermal bow, there is a fear in that the effects of reducing the drag cannot be sufficiently obtained by the return springs.

Further, in the case of the related art, in order to set the spring forces of the return springs respectively fixed to the inner-side friction pad and the outer-side friction pad equal to each other, a distance in the axial direction from the center of the disc in the axial direction to the abutment position (spring receiving surface) of the inner-side return spring on the distal end side and a distance in the axial direction from the center of the disc in the axial direction to the abutment position (spring receiving surface) of the outer-side return spring on the distal end side are required to be set equal to each other. In this case, a core is required at the time of manufacturing of a casting for the mounting member so as to adjust the thickness of the mounting member in the axial direction (to set the axial distances to the abutment positions of the inner-side return spring and the outer-side return spring equal to each other). As a result, there is a fear in that manufacturing costs increase.

Further, in the case of the related art, the return spring is configured to extend in the disc tangential direction. Thus, there is a fear in that the return spring including the receiving portion of the mounting member side, for receiving the return spring, is increased in size. Further, when the friction pads to which the return springs are mounted are assembled to the mounting member, there is a fear in that assembly work becomes complicated. Specifically, when the ear portions of the friction pads to which the return springs are mounted are inserted into the pad guides of the mounting members, the distal end side of each of the return springs is likely to be caught by the receiving surface side of the mounting member due to the extension of the distal end side of the return spring in the disc tangential direction prior to the insertion of the ear portions of the friction pads into the pad guides. As a result, there is a fear in that the assembly work becomes complicated.

On the other hand, according to the first embodiment, the abutment portion 25 that corresponds to the distal end side of the return spring 21 is configured to be elastically brought into abutment on the mounting member 2 side (the abutment plate portion 13D of the pad spring 13) on the outer side in the disc radial direction relative to the fixed portion 22 that corresponds to the base end side to be fixed to the back plate 7 of the friction pad 6. Therefore, based on the abutment between the abutment portion 25 and the mounting member 2 side, which are brought into abutment on each other at the position on the outer side in the disc radial direction relative to the fixed portion 22, the moment M in the direction in which the outer side of the friction pad 6 in the disc radial direction is separated away from the disc 1 is applied to the ear portion 7B of the back plate 7 of the friction pad 6 to which the fixed portion 22 of the return spring 21 is fixed.

Specifically, as illustrated in FIG. 10, the load F is applied to the abutment portion 25 of the return spring 21 in the disc axial direction by the abutment on the abutment plate portion 13D of the pad spring 13. As a result, based on the component F' of the load F, the moment M having the point P of effort as the center corresponding to the coupled portion (fixed portion) between the ear portion 7B of the friction pad 6 and the fixed portion 22 is applied to the friction pad 6. The moment M is a force for inclining the attitude of the friction pad 6 in the direction in which the radially outer side separates away from the disc 1 as compared with the radially inner side.

As a result, the attitude of the friction pad 6 at the return position tends to be inclined in the direction in which the outer side in the disc radial direction separates away from the disc 1 as compared with the inner side in the disc radial direction. Therefore, the drag between the radially outer side of the friction pad 6 and the disc 1 can be reduced. Further, at the same time, uneven wear of the lining 8 of each of the friction pads 6 can be suppressed. As a result, stability and reliability of braking performance can be ensured.

In other words, the distal end side of the return spring 21 is brought into abutment on the mounting member 2 side (the abutment plate portion 13D of the pad spring 13) at the position that is offset from the centroid (see the point O in FIG. 5) of the friction pad 6 and the center (see the point Q in FIGS. 5 and 10) of the guide sliding portion (the pad guide 3 and the ear portions 7B and 7C) in the disc radial direction, for guiding the friction pad 6 in the axial direction, to the outer side in she disc radial direction. As a result, the attitude of the friction pad 6 at the return position can be open outward (open upward) with the outer side in the disc radial direction being away from the disc 1. Here, the radially outer side of the disc 1 tends to oscillate in the disc axial direction as compared with the radially inner side. Therefore, the outer side of the friction pad 6 in the disc radial direction is separated away from the disc 1. As a result, the drag between the friction pad 6 and the disc 1 can be reduced at a higher dimension.

Further, even if the drag occurs, the effective radius of the drag can be reduced. Specifically, even when the disc 1 tends to be inclined to the outer side due to, for example, thermal bow, the effects of reducing the drag can be reliably obtained by the return spring 21 as compared with the related art. In the present invention, the outward opening (upward opening) is not necessarily required as long as the inward opening (downward opening) tendency can be suppressed.

According to the first embodiment, the distal end side of the return spring 21 presses the portion located on the outer side in the disc radial direction relative to the pad guide 3 so as to return the friction pad 6 to the return position. Therefore, the abutment plate portion 13D of the pad spring 13, which corresponds to the seating portion for receiving the distal end side of the return spring 21, can be formed on the radially outer side relative to the guide plate portion 13A of the pad spring 13. As a result, as compared with the related art, the deformation of the pad spring 13 due to the reaction force of the return spring 21, in particular, the deformation of the guide plate portion 13A can be suppressed. Therefore, the degradation of slidability of the friction pad 6 due to the deformation of the pad spring 13 and the degradation of low-pressure squeal can be suppressed.

Further, as compared with the related art, the abutment plate portion 13D, which corresponds to the seating portion for receiving the distal end side of the return spring 21, can be formed smaller (shorter). As a result, the pad spring 13 can be configured compact (in small size). Therefore, a yield of the pad spring 13 can be improved.

According to the first embodiment, the abutment position (spring receiving surface) is arranged on the outer side of the mounting member 2 in the disc radial direction, that is, at a portion where the shape is symmetrical on the inner side and the outer side. Therefore, the axial distance from the center of the disc 1 in the axial direction to the abutment position (spring receiving surface) on the distal end side of the inner-side return spring 21 and the axial direction from the center of the disc 1 in the axial direction to the abutment position (spring receiving surface) on the distal end side of the outer-side return spring 21 can be easily set equal to each other. Therefore, the core at the time of manufacturing of the casting for the mounting member 2, which is required to adjust the axial plate thickness of the mounting member 2 (set the axial distances to the abutment positions of the inner-side and outer-side return springs 21 equal to each other), is not required. As a result, manufacturing costs can be lowered.

According to the first embodiment, the distal end side of the return spring 21 extends outward in the disc radial direction relative to the base end side. Therefore, when the friction pad 6 to which the return spring 21 is mounted is assembled to the mounting member 2, specifically, the ear portions 7B and 7C of the friction pad 6 are inserted into the pad guide 3 of the mounting member 2 in a state in which the friction pad 6 to which the return spring 21 is mounted is inclined so that the outer side in the disc radial direction is separated away from the disc 1 relative to the inner side, the distance (interference) between the distal end (abutment portion 25) of the return spring 21 and the mounting member 2 side (abutment plate portion 13D of the pad spring 13) can be increased. As a result, the distal end (abutment portion 25) of the return spring 21 can be brought into abutment on the mounting member 2 side (abutment plate portion 13D of the pad spring 13) after the ear portions 7B and 7C of the friction pad 6 are inserted into the pad guide 3 of the mounting member 2. As a result, the assembly work of the friction pad 6 to which the return spring 21 is mounted can be facilitated, and ease of assembly can be improved.

According to the first embodiment, as illustrated in FIG. 11, the spring material 101 for forming the return spring 21 and the side pressure spring 26 can be formed into an approximately L-like shape. Therefore, when the spring material 101 is obtained by shaping (die-cutting) a metal plate by means of pressing or the like, the yield of the spring material 101 can be improved. Further, burr is prevented from being generated between the abutment portion 25 of the return spring 21 and the pressing portion 27 of the side pressure spring 26, that is, a portion sliding against a mated member Can elastically contact portion) at the time of shaping (blanking).

Further, the dimension of the spring forming member 20 including the return spring 21 and the side pressure spring 26 in the disc radial direction can be reduced. Specifically, the fixed portion 22 is shared by the return spring 21 and the side pressure spring 26, while the return spring 21 is extended from the fixed portion 22 in the disc radial direction. In this manner, the disc radial dimension of the fixed portion 22 can be reduced. Thus, the extended portion 11A for preventing turning-up, which extends in the disc tangential direction, is formed on the outer-side shim plate 11, and the extended portion 11A is brought into abutment on the torque receiving surface 4 (through each of the guide plate portions 13A of the pad springs 13). In this manner, the position of the shim plate 11, which corresponds to a floating shim, can be regulated. As a result, ease of assembly of the shim plates 11 can be improved. Further, the need of an erected portion for regulating the position relative to the cylinder can be eliminated from the shim plate 11. Thus, costs can be reduced by omitting erecting processing.

According to the first embodiment, the return spring 21 has such a configuration that the distal end side extends outward from the base end side in the disc radial direction. Therefore, as compared with a configuration in which the distal end side of the return spring extends from the base end side in the disc tangential direction, the dimension in the disc tangential direction can be set small (compact). In this manner, when the friction pad 6 to which the return spring 21 is mounted is assembled to the mounting member 2, the deformation of the torque receiving portion (guide plate portion 13A) of the pad spring 13, which is caused by the distal end side of the return spring 21 being caught by the mounting member 2 or the pad spring 13, can be suppressed.

According to the first embodiment, the return spring 21 and the side pressure spring 26 extend from different sides of the fixed portion 22 having an approximately rectangular shape. Therefore, as compared with a configuration in which the return spring and the side pressure spring are extended from the same side of the fixed portion, the degree of freedom in setting of width dimensions of the return spring 21 and the side pressure spring 26 can be improved. Specifically, when the width dimensions of the springs are increased so as to increase loads (biasing forces) of the return spring 22 and the side pressure spring 26, the width dimensions of the respective springs can be independently set. The loads including an increase in load can be easily adjusted.

According to the first embodiment, in the return spring 21, the folded portion 25A of the abutment portion 25 that is on the distal end side of the return spring 21 is offset in the tangential direction of the disc 1 relative to the rising portion 23A of the first extended portion 23 that is on the base end side thereof, thereby avoiding the interference with the side pressure spring 26. As a result, with the configuration in which the return spring 21 extended outward in the disc radial direction and the side pressure spring 26 extended in the disc tangential direction are formed integrally, the entire spring forming member 20 can be formed in small size while avoiding the interference between the return spring 21 and the side pressure spring 26.

In the first embodiment described above, the case where the return spring 21 and the side pressure spring 26 are formed integrally has been described as an example. However, the return spring and the side pressure spring are not limited thereto and may be formed, for example, as independent members.

In the first embodiment described above, the case where the pad guide 3 having the concave shape is formed on the arm portion 2A of the mounting member 2 and the ear portions 7B and 7C, which correspond to fitting portions of the back plate 7, are formed into a convex shape has been described as an example. However, the configuration is not limited thereto. For example, the fitting portion having a concave shape may be formed in the back plate of the friction pad and the pad guide having a convex shape may be formed on the arm portion of the mounting member.

In the first embodiment described above, the case where the so-called integral-type pad springs 13, each including the guide plate portion 13A and the radial-direction biasing plate portion 13C, are used respectively for the inner side and the outer side of the disc 1, has been described as an example. However, the present invention is not limited thereto. For example, two pad springs having shapes obtained by cutting the pad spring into segments for the inner side and the outer side of the disc may be respectively arranged on the inner side and the outer side of the disc.

In the first embodiment described above, the case where the two pistons 5D are arranged on the inner leg portion 5A of the caliper 5 has been described as an example. However, the configuration is not limited thereto. For example, one piston may be arranged on the inner leg portion of the caliper, or three or more pistons may be arranged on the inner leg portion of the caliper.

In the first embodiment described above, the so-called floating caliper type disc brake having the configuration in which the pistons 5D are slidably arranged on the inner leg portion 5A of the caliper 5 through the cylinders and the outer leg portion 5C of the caliper 5 is brought into abutment on the outer-side friction pad 6 has been described, as an example. However, the configuration is not limited thereto. For example, the present invention may be applied to a so-called opposed-piston disc brake having a configuration in which the pistons are arranged respectively on the inner side and the outer side of the caliper.

In the first embodiment described above, the example where the spring forming member 20 is fixed by caulking has been described. However, the first embodiment is not limited thereto. The spring forming member 20 may be fixed by clamping to the ear portions 7B and 7C of the back plate 7 of the friction pad 6. The fixing method may be appropriately designed.

According to the first embodiment described above, the drag between the radially outer side of the friction pad and the disc can be reduced.

Specifically, according to the first embodiment, the distal end side of the return spring is elastically brought into abutment on the mounting member side on the outer side in the disc radial direction relative to the base end side fixed to the back plate of the friction pad. Therefore, based on the abutment between she distal end side and the mounting member side, which are brought into abutment on the position on the outer side in the disc radial direction relative to the base end side, the moment in the direction of separating the outer side of the friction pad in the disc radial direction from the disc is applied to the fixed portion between the base end side of the return spring and the back plate of the friction pad. As a result, the attitude of the friction pad at the return position tends to be inclined in the direction in which the outer side in the disc radial direction separates away from the disc as compared with the inner side in the disc radial direction. Therefore, the drag between the radially outer side of the friction pad and the disc can be reduced. Further, at the same time, uneven wear of the lining of each of the friction pads can be suppressed.

In other words, the distal end side of the return spring is brought into abutment on the mounting member side at the position that is offset from the centroid of the friction pad and the center of the guide sliding portion for guiding the friction pad in the axial direction, to the outer side in the disc radial direction. As a result, the attitude of the friction pad at the return position can be open outward (open upward) with the outer side in the disc radial direction being away from the disc. Here, the radially outer side of the disc tends to oscillate in the disc axial direction as compared with the radially inner side. Therefore, the outer side of the friction pad in the disc radial direction is separated away from the disc. As a result, the drag between the friction pad and the disc can be reduced at a higher dimension.

Further, even if the drag occurs, the effective radius of the drag can be reduced. Specifically, even when the disc tends to be inclined to the outer side due to, for example, thermal bow, the effects of reducing the drag can be effectively obtained by the return spring as compared with the related art.

According to the first embodiment, the base end side of the return spring is offset in the disc tangential direction relative to the distal end side, thereby avoiding the interference with the side pressure spring. In this manner, with the configuration in which the return spring extended to the outer side in the disc radial direction and the side pressure spring extended in the disc tangential direction are formed integrally, the entire spring forming member can be formed in small size while avoiding the interference between the return spring and the side pressure spring.

Next, a second embodiment of the present invention is described referring to FIGS. 12 to 16.

Prior to the description of the second embodiment, the problem of the related art is first described. In the related art, if the friction pad is worn with elapse of time, the position of the based end side of the return spring, specifically, the fixed side of the friction pad to the back plate in the disc axial direction becomes closer to the disc. In this manner, the amount of deformation of the return spring gradually increases. Therefore, as indicated by the dotted line in FIG. 12, as a movement amount ΔZ of the fixed portion of the return spring starts increasing from the time at which the friction pad is new, the spring load F generated by the return spring increases. In this manner, when the friction pad is worn with elapse of time, the spring load F increases. Therefore, a force of returning the friction pad at the time of releasing braking increases, resulting in such an attitude that the opposite side pressed by the return spring relative to the center of the friction pad is inclined so as to be closer to the disc. Specifically, in the case of the related art, the trailing side of the friction pad becomes closer to the disc. The attitude of the friction pad is inclined relative to the disc rotating direction. Further, in the case of the disc brake according to the first embodiment, the inner side of the friction pad in the disc radial direction becomes closer to the disc. As a result, the attitude of the friction pad is inclined in the disc radial direction. With such an attitude of the friction pad, there is a fear in that the side of the friction pad, which becomes closer to the disc, is brought into abutment on the disc, thereby causing uneven wear of the friction pad while the vehicle is running during non-braking.

The second embodiment has an object to provide a disc brake capable of suppressing the occurrence of uneven wear of the friction pad even when the friction pad is worn with elapse of time as described above. The same configuration of the second embodiment as that of the first embodiment is hereinafter denoted by the same reference symbol and is described while omitting a detailed description thereof.

Figure 13:
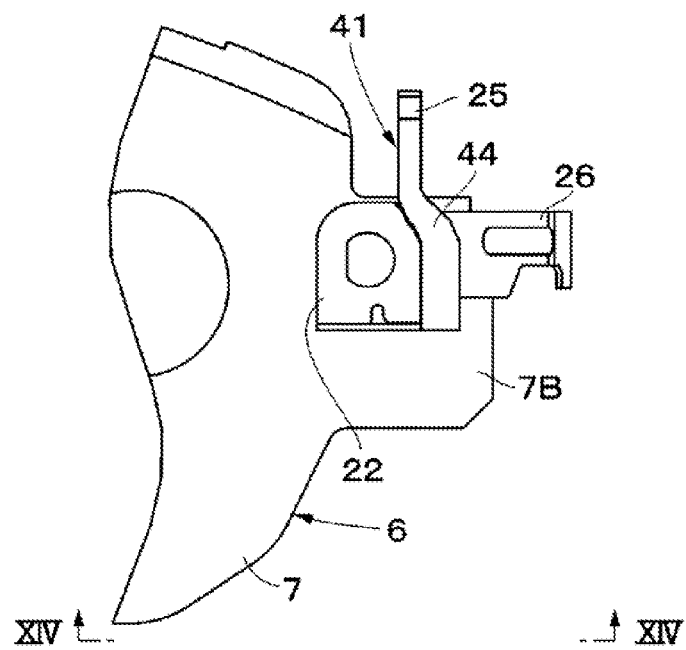
FIG. 13 is a front view illustrating the return spring according to the second embodiment and the outer-side friction pad in a partially enlarged manner when viewed in the same direction as that in FIG. 5.
Figure 14:
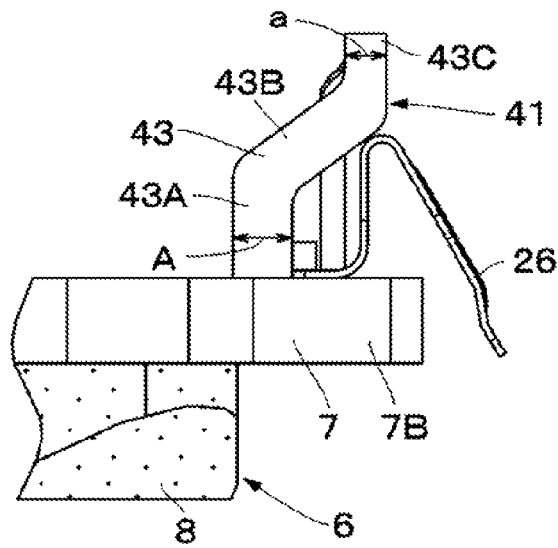
FIG. 14 is a bottom view illustrating the return spring according to the second embodiment and the outer-side friction pad in a partially enlarged manner when viewed in the direction XIV-XIV in FIG. 13.
Figure 15:
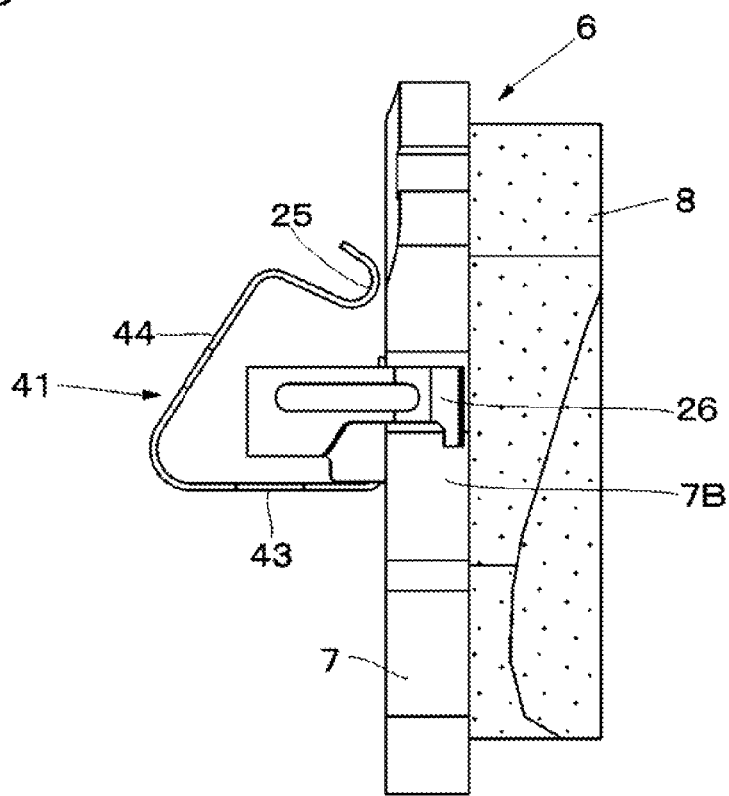
FIG. 15 is a side view illustrating the return spring according to the second embodiment and the outer-side friction pad in a partially enlarged manner when viewed in the same direction as that of FIG. 7.
Figure 16:
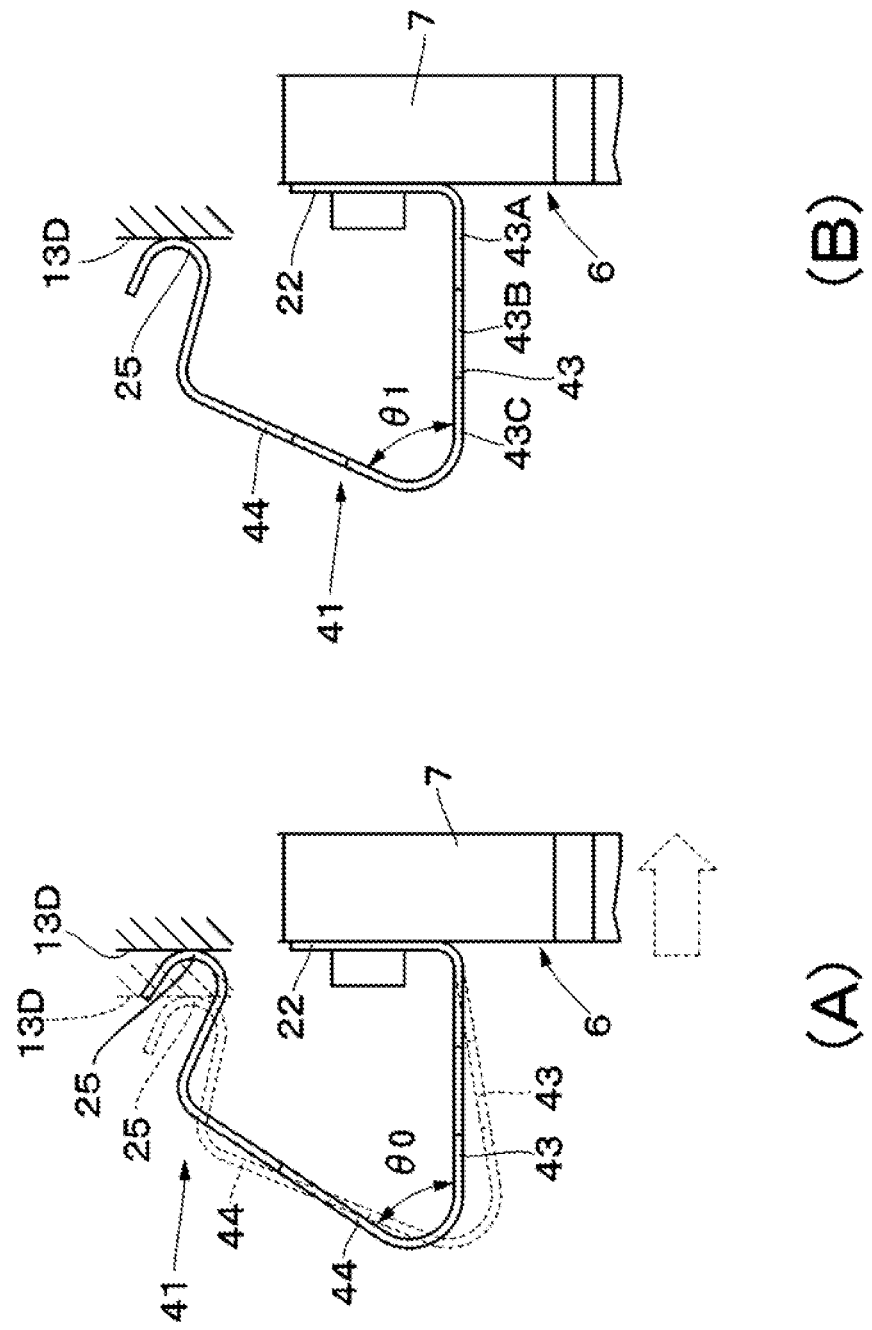
FIG. 16 is conceptual view illustrating an actuated state of the return spring according to the second embodiment.

FIGS. 13 to 15 illustrate a return spring 41 according to the second embodiment. Similarly to the return spring 21 of the first embodiment described above, the return spring 41 has a configuration in which the side pressure spring 26 is formed integrally therewith. Further, the return spring 41 is arranged between the friction pad 6 and the mounting member 2, more specifically, between the ear portion 7B on the disc leading side and the pad spring 13 mounted to the mounting member 2. The return spring 41 has a base end side fixed to the back plate 7 of the friction pad 6 and a distal end side elastically brought into abutment on the mounting member 2 side at a position on the outer side in the disc radial direction relative to the base end side. Therefore, the return spring 41 includes the fixed portion 22, a first extended portion 43, a second extended portion 44, and the abutment portion 25. Further, in the second embodiment, the return spring 41 is formed by, for example, bending after punching a spring steel having 0.5 mm as a plate thickness t.

The first extended portion 43 is formed by bending into an L-like shape so as to rise vertically from the fixed portion 22 and has a distal end side that is extended in the direction vertically away from the surface of the disc 1. Specifically, the first extended portion 43 has the base end side, which corresponds to a rising portion 43A to extend in the disc axial direction and a distal end side from the middle portion, which corresponds to an inclined portion 43B to extend obliquely with respect to the disc axial direction, specifically, in the direction closer to the torque receiving surface 4 of the mounting member 2. Then, as illustrated in FIG. 14, a portion of the first extended portion 43, which is closer to the second extended portion 44 side relative to the inclined portion 43B, specifically, a distal end side 43C of the first extended portion 43 has a shape gradually narrowed in the plate width direction. A plate width a of a portion of the first extended portion 43 on the distal end side 43C, which has a minimum plats width, is set smaller than a plate width A of a portion of the rising portion 43A.

The second extended portion 44 is formed by bending outward the distal end side 43C of the first extended portion 43 at an acute angle or a right angle (about 45 to 90 degrees) in the disc radial direction and in a direction closer to the abutment plate portion 13D of the pad spring 13 and extends outward in the disc radial direction toward the abutment plate portion 13D of the pad spring 13, thereby being connected to the abutment portion 25. Specifically, the second extended portion 44 is extended outward beyond an outer edge of the friction pad 6 (the ear portion 7B thereof) so as to be connected to the abutment portion 25. The second extended portion 44 is formed so as to have the same plate width a in the entire region as that of the portion of the first extended portion 43 on the distal end side 43C. In FIG. 13, the second extended portion 44 is inclined in a depth direction in FIG. 13 and therefore is illustrated as being narrowed in the middle in terms of illustration. In practice, however, the plate width is even as described above. Further, the abutment portion 25 also has the same place width a as that of the second extended portion 44. Specifically, the return spring 41 is extended with the same plate width a as that of the portion of the first extended portion 43 on the distal end side 43C toward the second extended portion 44 and the abutment portion 25 that are closer to the distal end side relative to the portion of the first extended portion 43 on the distal end side 43C. Here, in the second embodiment, the first extended portion 43 and the second extended portion 44 form an extended portion that connects the fixed portion 22 and the abutment portion 25 to each other, specifically, an extended portion having one end side extended from the fixed portion in the disc axial direction and in a direction of separating away from the friction pad and another end side extended outward beyond the outer edge of the friction pad so as to be connected to the abutment portion.

The return spring 41 constantly biases the friction pad 6 (back plate 7) in the return direction of separating away from the disc 1. For example, when the vehicle brake operation is performed, the return spring 41 in a state indicated by the solid line in FIG. 16(A) is elastically deformed into a state indicated by the dotted line in FIG. 16(A) so as to generate the spring load F. Then, when the brake operation is released, the friction pad 6 can be stably returned to the return position (initial position; waiting position), specifically, from the state indicated by the dotted line in FIG. 16(A) to the state indicated by the solid line in FIG. 16(A). In this case, the abutment portion 25 of the return spring 41 as the distal end side is brought into abutment, with elasticity, on the abutment plate portion 13D of the pad spring 13, which is located on the disc radially outer side relative to the fixed portion 22 as the base end side and is on the side closer to the mounting member 2.

Here, as described above, the return spring 41 is formed so that the plate width a of the portion of the first extended portion 43 on the distal end side 43C is smaller than the plate width A of the portion of the rising portion 43A. As a result, when the spring load F is generated along with the movement of the friction pad 6, a bending stress concentrates on the portion of the first extended portion 43 on the distal end side 43C. Then, when the movement amount of the friction pad 6, that is, a movement amount $\Delta Z$ of the fixed portion 22 of the return spring 41 from the time at which the friction pad is new increases, the portion of the first extended portion 43 on the distal end side 43C is plastically deformed due to the spring load F, as illustrated in FIG. 16(B). Due to the plastic deformation, an angle $\theta 1$ illustrated in FIG. 16(B) becomes larger than an angle $\theta 0$ illustrated in FIG. 16(A) as an angle formed between the first extended portion 43 and the second extended portion 44. Then, as a result of the occurrence of the plastic deformation described above, for the return spring 41, the relationship between the spring load F and the movement amount $\Delta Z$ of the fixed portion 22 of the return spring 41 from the time at which the friction pad in new exhibits a non-linear characteristic, as indicated by the solid line in FIG. 12. The spring load F with respect to the movement amount $\Delta Z$ of the fixed portion 22 of the return spring 41 from the time at which the friction pad is new can be kept smaller than that of a related-art return spring that is not plastically deformed.

As described above, the plate width a of the portion of the first extended portion 43 on the distal end side 43C of the return spring 41 is formed smaller than the plate width A of the portion of the rising portion 43A. As a result, the movement amount $\Delta Z$ of the fixed portion 22 of the return spring 41 from the time at which the friction pad is new increases, the portion of the first extended portion 43 on the distal end side 43C is plastically deformed. As a result, an increase in the spring load F with elapse of time can be suppressed, and therefore the uneven wear of the friction pad can be suppressed.

The second embodiment is conceptually described as follows.

A disc brake, including:
a mounting member fixed to a non-rotating portion of a vehicle and formed over an outer circumferential side of a disc;
a caliper arranged on the mounting member so as to be movable in an axial direction of the disc;
a pair of friction pads mounted movably to the mounting member so as to be pressed against both surfaces of the disc by the caliper; and
return springs made of a metal plate respectively arranged between the pair of friction pads and the mounting member, for biasing the pair of friction pads in a return direction in which the pair of friction pads are separated away from the disc, in which:
each of the return springs includes:
a fixed portion formed on one end side so as to be fixed to a flat surface of the each of the pair of friction pads, which is on a side opposite to a disc abutment surface;
an abutment portion formed on another end side so as to be elastically brought into abutment on the mounting member side; and
an extended portion for connecting the fixed portion and the abutment portion with each other;
after one end side of the extended portion is extended from the fixed portion in the axial direction of the disc and in a direction of separating away from the each of the pair of friction pads, another end side of the extended portion is extended to an outer side beyond an outer edge of the each of the pair of friction pads so as to be connected to the abutment portion; and
a plate width of the extended portion becomes smaller in a middle than a plate width of the one end to be connected to the fixed portion.

In the second embodiment described above, the second extended portion 44 extends outward in the disc radial direction toward the abutment plate portion 13D of the pad spring 13 so as to be connected to the abutment portion 25. However, the connection is not limited thereto. Any connection may be employed as long as the second extended portion 44 extends outward beyond the outer edge of the friction pad 6 so as to be connected to the abutment portion 25. Specifically, as in the case of the related art, the second extended portion may extend outward in the disc rotating direction of the friction pad 6 so as to be connected to the abutment portion 25.

Figure 17:
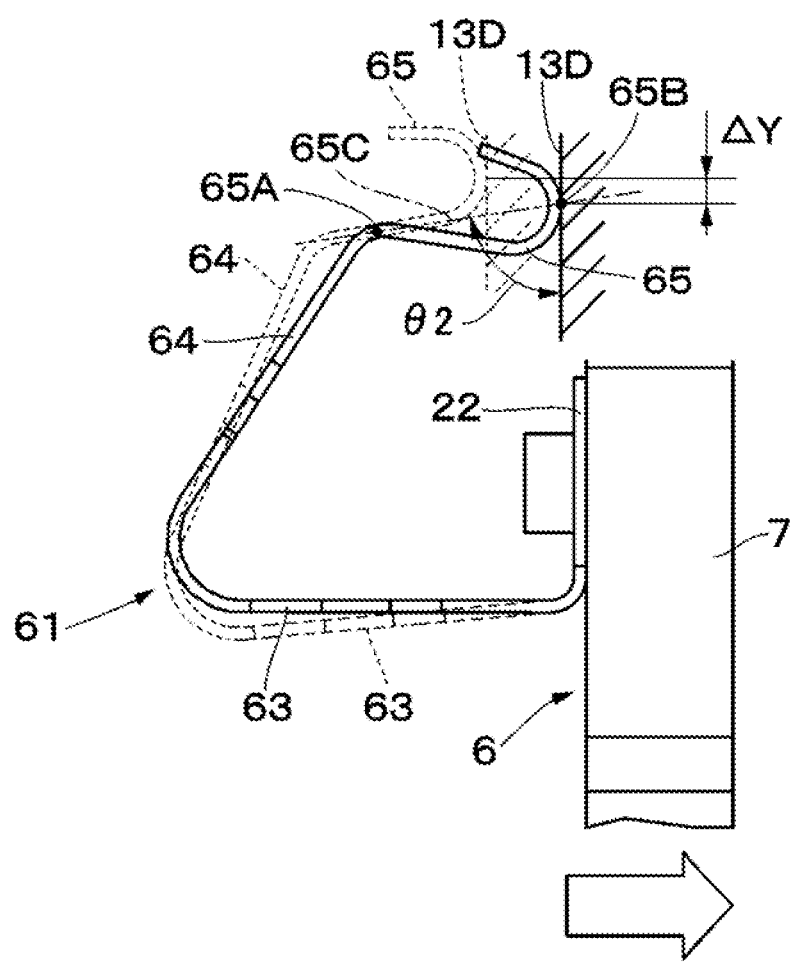
FIG. 17 is a conceptual view illustrating an actuated state of a return spring according to a third embodiment of the present invention.

Next, a third embodiment of the present invention is described referring to FIG. 17. Similarly to the second embodiment, the third embodiment has an object to suppress the uneven wear of the friction pad. Further, in contrast to the second embodiment in which the first extended portion 43 is plastically deformed so as to suppress an increase in the spring load F of the return spring 41, which is caused due to the wear of the friction pad 6, a position at which an abutment portion 65 of a return spring 61 is brought into abutment on the mounting member 2 side gradually shifts to the outer side in the disc radial direction (see ΔY in FIG. 17) along with the wear of the friction pad 6 in the third embodiment. In this manner, a distance from the fixed portion 22 to the abutment portion 65 is changed so as to suppress an increase in the spring load F of the return spring 61.

The return spring 61 includes the fixed portion 22, a first extended portion 63, a second extended portion 64, and the abutment portion 65. The first extended portion 63 (extending portion), the second extended portion 64 (extending portion), and the abutment portion 65 are formed so as to have, for example, the same plate width. The plate width is set so that the plastic deformation is not increased even in a state in which the lining 8 of the friction pad 6 is fully worn as compared with a new product. Then, the abutment portion 65 is formed so that an angle θ2 formed between the abutment plate portion 13D as an abutment surface on the mounting member 2 side and a virtual line segment 65C connecting a connection point 65A of the abutment portion 65 with the second extend portion 64 and an abutment point 65B of the abutment portion 65 with the abutment plate portion 13D becomes an acute angle. Specifically, the abutment portion 65 is formed so as to be extended so that the angle θ2 formed between a direction of the flat surface of the abutment plate portion 13D and a direction from the position of connection with the second extended portion 64 toward the abutment point 65B with the abutment plate portion 13D on the mounting member 2 side becomes an acute angle.

The return spring 61 is configured as described above. As a result, along with the wear of the friction pad 6, the abutment position of the abutment portion 65 of the return spring 61 with the mounting member 2 side gradually shifts to the outer side in the disc radial direction, as indicated by ΔY in FIG. 17. In this manner, a distance from the fixed portion 22 to the abutment portion 65 is changed so that an increase in the spring load F of the return spring 61 can be suppressed. Thus, the uneven wear of the friction pad 6 can be suppressed.

The third embodiment is conceptually described as follows.

A disc brake, including:
a mounting member fixed to a non-rotating portion of a vehicle and formed over an outer circumferential side of a disc;
a caliper arranged on the mounting member so as to be movable in an axial direction of the disc;
a pair of friction pads mounted movably to the mounting member so as to be pressed against both surfaces of the disc by the caliper; and
return springs made of a metal plate respectively arranged between the pair of friction pads and the mounting member, for biasing the pair of friction pads in a return direction in which the pair of friction pads are separated away from the disc, in which:
each of the return springs includes;
a fixed portion formed on one end side so as to be fixed to a flat surface of the each of the pair of friction pads, which is on a side opposite to a disc abutment surface;
an abutment portion formed on another end side so as to be elastically brought into abutment on the mounting member side; and
an extended portion for connecting the fixed portion and the abutment portion with each other; and
the abutment portion is formed so as to be extended from the extended portion so that an angle formed between a direction from a connecting position with the extended portion toward an abutment point on the mounting member side and a direction of a flat surface of an abutment surface on the mounting member side becomes an acute angle.

In the third embodiment described above, similarly to the second embodiment, the second extended portion 64 extends outward in the disc radial direction toward the abutment plate portion 13D of the pad spring 13 so as to be connected to the abutment portion 65. However, the connection is not limited thereto. Any connection may be employed as long as the second extended portion 64 extends outward beyond the outer edge of the friction pad 6 so as to be connected to the abutment portion 65. Specifically, as in the case of the related art, the second extended portion may extend outward in the disc rotating direction of the friction pad 6 so as to be connected to the abutment portion 65.

EXPLANATION OF REFERENCE SIGNS

1 disc
2 mounting member
5 caliper
6 friction pad
13 pad spring
13D abutment plate portion (abutment plate)
21, 41, 61 return spring
22 fixed portion
23, 43, 63 first extended portion
24, 44, 64 second extended portion
25, 65 abutment portion
26 side pressure spring

The invention claimed is:

1. A disc brake, comprising:
a mounting member fixed to a non-rotating portion of a vehicle and formed over an outer circumferential side of a disc;
a caliper arranged on the mounting member so as to be movable in an axial direction of the disc;
a pair of friction pads mounted movably to the mounting member so as to be pressed against both surfaces of the disc by the caliper; and
return springs made of a metal plate respectively arranged between the pair of friction pads and the mounting member, for biasing the pair of friction pads in a return direction in which the pair of friction pads are separated away from the disc,
each of the return springs having a base end side and a distal end side,
the base end side being fixed to a back plate of each of the pair of friction pads, and
the distal end side being elastically brought into abutment on the mounting member side at a position on an outer side in a disc radial direction relative to the base end side and on an inner side of the friction pads in a disc circumferential direction relative to the disc circumferential end of the friction pad.

2. A disc brake according to claim 1, wherein:
the return springs respectively comprise side pressure springs for biasing the pair of friction pads in a tangential direction of the disc; and
the each of the return springs offsets the base end side in the circumferential direction of the disc relative to the distal end side so as to avoid interference with each of the side pressure springs.

3. A disc brake according to claim 2, wherein the each of the return springs is brought into abutment on the mounting member side through an abutment plate made of a metal interposed between the each of the return springs and the mounting member.

4. A disc brake according to claim 3, wherein the abutment plate is extended from a pad spring for receiving a torque in a disc rotating direction together with the back plate of the each of the pair of friction pads.

5. A disc brake according to claim 1, wherein:
the return springs respectively comprise side pressure springs for biasing the pair of friction pads in a circumferential direction of the disc; and
the return springs are arranged so as to pass through an outer side of the side pressure springs in the axial direction of the disc so as to avoid interference with the side pressure springs.

6. A disc brake according to claim 5, wherein the each of the return springs is brought into abutment on the mounting member side through an abutment plate made of a metal interposed between the each of the return springs and the mounting member.

7. A disc brake according to claim 6, wherein the abutment plate is extended from a pad spring for receiving a torque in a disc rotating direction together with the back plate of the each of the pair of friction pads.

8. A disc brake according to claim 1, wherein the each of the return springs is brought into abutment on the mounting member side through an abutment plate made of a metal interposed between the each of the return springs and the mounting member.

9. A disc brake according to claim 8, wherein the abutment plate is extended from a pad spring for receiving a torque in a disc rotating direction together with the back plate of the each of the pair of friction pads.

10. A disc brake according to claim 1, wherein:
each of the return springs comprises:
a fixed portion formed on one end side so as to be fixed to a flat surface of the each of the pair of friction pads, which is on a side opposite to a disc abutment surface;
an abutment portion formed on another end side so as to be elastically brought into abutment on the mounting member side; and
an extended portion for connecting the fixed portion and the abutment portion with each other;
one end side of the extended portion is extended from the fixed portion in the axial direction of the disc and in a direction of separating away from the each of the pair of friction pads, and another end side of the extended portion is extended to an outer side beyond an outer edge of the each of the pair of friction pads so as to be connected to the abutment portion; and
a plate width of the extended portion becomes smaller in a middle than a plate width of the one end to be connected to the fixed portion.

11. A disc brake according to claim 1, wherein:
each of the return springs comprises:
a fixed portion formed on one end side so as to be fixed to a flat surface of the each of the pair of friction pads, which is on a side opposite to a disc abutment surface;
an abutment portion formed on another end side so as to be elastically brought into abutment on the mounting member side; and
an extended portion for connecting the fixed portion and the abutment portion with each other; and
the abutment portion is formed so as to be extended from the extended portion so that an angle formed between a direction from a connecting position with the extended portion toward an abutment point on the mounting member side and a direction of a flat surface of an abutment surface on the mounting member side becomes an acute angle.

* * * * *